(12) United States Patent
Nishida et al.

(10) Patent No.: US 6,507,448 B2
(45) Date of Patent: Jan. 14, 2003

(54) INFORMATION RECORDING DEVICE HAVING A FUNCTION OF ERASING INFORMATION IN A STANDBY STATE

(75) Inventors: Syuji Nishida, Kawasaki (JP); Ikuya Tagawa, Kawasaki (JP); Yuji Uehara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/736,826

(22) Filed: Dec. 14, 2000

(65) Prior Publication Data
US 2001/0043418 A1 Nov. 22, 2001

(30) Foreign Application Priority Data
May 12, 2000 (JP) ........................................ 2000-139466

(51) Int. Cl.$^7$ ................................................. G11B 5/03
(52) U.S. Cl. ............................. 360/66; 360/57; 360/45; 360/68
(58) Field of Search ............................. 360/57, 55, 45, 360/68, 66, 118

(56) References Cited

U.S. PATENT DOCUMENTS 4,949,199 A * 8/1990 Yunoki ........................ 360/118

FOREIGN PATENT DOCUMENTS

| JP | 57-183612 A | 11/1982 |
|----|-------------|---------|
| JP | 58-147803 A | 9/1983 |
| JP | 4-125802 A | 4/1992 |
| JP | 05002706 | 1/1993 |
| JP | 06036207 | 2/1994 |
| JP | 08194903 | 7/1996 |
| JP | 11086213 | 3/1999 |

OTHER PUBLICATIONS

S. Nishida, I. Tagaw a and Y. Uehara, " Bit–Shift Model Taking Account of the Effect of Written Bits", Journal of the Magnetics Society of Japan, vol. 24, No. 4–2, 2000, pp. 351–354.

* cited by examiner

Primary Examiner—Alan T. Faber
(74) Attorney, Agent, or Firm—Greer, Burns & Crain, Ltd.

(57) ABSTRACT

An information recording device which records information at a high recording density such that an error rate is reduced. In particular, an information recording device that includes a recording head, arranged near or to be close to the recording medium, for applying magnetic fields to the small regions when the recording head relatively moves with respect to the recording medium to pass on the small regions of the recording medium, and a recording head controller for controlling the recording head to cause the recording head to apply magnetic fields to the small regions in a free region of the recording medium in a standby state in which at least information is not recorded on the recording medium to uniform the directions of magnetization of the small regions so as to erase the information in the predetermined free region.

6 Claims, 17 Drawing Sheets

INFORMATION RECORDING DEVICE HAVING A FUNCTION OF ERASING INFORMATION IN A STANDBY STATE

BACKGROUND OF THE INVENTION

1. Field of the Invention

The present invention relates to an information recording device for recording information on a recording medium.

2. Description of the Related Art

In recent years, with the spread of computers, large amounts of information are commonly dealt, and hard disk drives (HDD) are used as one of information recording devices for recording large amounts of information. The HDD has a magnetic disk serving as a disk like medium on which information is recorded, a recording head for recording information on the magnetic disk, and a reproducing head for reproducing the information recorded on the magnetic disk.

The magnetic disk has a magnetic layer consisting of a ferromagnetic material on the surface of the disk or near the surface, and magnetic states are independently held in small regions of the magnetic layer. In operation of the HDD, the magnetic disk is rotated in the HDD at a high speed.

The recording head has a small recording coil and a pair of magnetic poles, and is normally arranged near the magnetic disk rotated at a high speed together with the reproducing head. The magnetic poles of the recording head are opposite to each other at a predetermined interval (gap length: GL) in a direction in which the tracks of the magnetic disks extend, and have a predetermined width (core width: w) corresponding to a track width in a direction of track width. When a signal current flows in the recording coil of the recording head, a magnetic field depending on the signal current is generated by the recording coil, the magnetic field leaks from one pair of magnetic poles of the recording head to the outside, and the directions of magnetization of the tracks on the surface of the magnetic disk are appropriately inverted in units of small lengths. A recording pattern of magnetization is formed by the inversion of magnetization on the tracks of the magnetic disk, and information is recorded in the form of the recording pattern.

In the HDD, in general, overwrite recording in which a new recording pattern of magnetization is overwritten on the recording pattern of previous magnetization of recorded on the magnetic disk in advance is performed.

However, in the overwrite recording, a recording magnetic field applied to tracks by a recording head is weakened by a diamagnetic field generated by previous magnetization, so that hard transition shift (HTS) in which the position of a magnetization transition point of a regional (magnetization inverted region) boundary whose direction of magnetization is inverted by a recording magnetic field is shifted occurs. Since the amount of the HTS is an amount depending on the recording pattern of the previous magnetization, it is difficult to predict the amount of shift in the position of the magnetization transition point. If HTS occurs, a reproduced waveform including the information of a recording pattern is generated by the reproducing head. However, since the peak position of the reproduced waveform is shifted, an error rate (frequency at which a read error in the direction of magnetization of a recording pattern is generated) increases.

It is known that an amount of shift is decreased by increasing the gap length GL of the recording head because the intensity of a diamagnetic field generated by previous magnetization decreases. However, when the gap length GL is increased, the recording blurred region in which a magnetic field from the recording head leaks to the outside of a track spreads. As in a conventional technique, when a track width is large, and when a recording density of information recorded on the magnetic disk is low, an error rate can be reduced by increasing the gap length GL. However, in recent years, the recording density of a magnetic disk sharply increases. When a recording density is high as described above, even though the gap length GL is simply increased to suppress the influence of HTS, an error rate still increases due to the influence of recording blur.

SUMMARY OF THE INVENTION

The present invention is made in consideration of the above circumstances, and has as its object to provide an information recording device which records information at a high recording density such that an error rate is decreased.

The first information recording device of information recording devices according to the present invention to achieve the above object, in which magnetic fields are applied to small regions of a disk-like recording medium having magnetizations in small regions on a surface to invert the directions of magnetization of the small regions so as to record information on the recording medium, including:

a magnetic head, arranged near or to be close to the recording medium, for applying magnetic fields to the small regions when the magnetic head relatively moves with respect to the recording medium to pass on the small regions of the recording medium; and a magnetic head controller for controlling the magnetic head to cause the magnetic head to apply magnetic fields to the small regions in a free region of the recording medium in a standby state in which at least information is not recorded on the recording medium to make the directions of magnetization of the small regions uniform so as to erase the information in the predetermined free region.

Since the first information recording device of the present invention erases information in a standby state, as will be described below, adjustment of the position of a magnetization transition point such as the HTS can be efficiently performed. By the adjustment of the position of the magnetization transition point, information recording at a high recording density is performed with a small error rate.

The first information recording device of the present invention is preferably an information recording device in which the magnetic head controller controls the magnetic head to cause the magnetic head to apply magnetic fields to the small regions of the free region in which the information is erased at timings depending on the directions of the magnetic fields to record information.

When the magnetic fields are appropriately applied at the timings, as will be described in the embodiment, adjustment of the position of the magnetization transition point such as the HTS is performed.

The first information recording device of the present invention is an information recording device in which the magnetic head controller controls the magnetic head to cause the magnetic head to apply magnetic fields to the small regions at least twice to erase information in the small regions.

When the magnetic fields are applied at least twice, the information is more reliably erased.

The first information recording device of the present invention is preferably an information recording device in which the magnetic head controller controls the magnetic head to apply a magnetic field which is stronger when information is erased than when information is recorded.

When the strong magnetic field is applied, information is more preferably erased.

The first information recording device is an information recording device in which the magnetic head has a recording head for recording information, and the recording head also has a function of erasing information.

As in the first information recording device of the present invention, in the device having a function of erasing information in a standby state by a magnetic head, different magnetic heads in which recording and erasing are performed by a recording head and an erasing head, respectively need not be prepared, it is sufficient that only one magnetic head serving as a recording head and an erasing head is prepared. In this case, the device needs only a simple configuration, and is inexpensive. Positional shift (to be described later) does not occur.

The second information recording device of information recording devices according to the present invention to achieve the above object, in which magnetic fields are applied to small regions of a rotatable disk-like recording medium having magnetizations in small regions on a surface to invert the directions of magnetization of the small regions so as to record information on the recording medium, including:

a recording head, fixed to a distal end of an arm having a predetermined rotating center and a distal end moving on the recording medium in a diameter direction of the recording medium, for recording information by applying magnetic fields to the small regions when the magnetic head relatively moves with respect to the recording medium while being near or in contact with the recording medium to pass on the small regions of the recording medium; and a recording head controller for controlling the recording head to cause the magnetic head to apply magnetic fields to the small regions in a predetermined region of the recording medium to make the directions of magnetization of the small regions uniform so as to erase the information in the predetermined region, and for causing the recording head to apply magnetic fields to the small regions of the predetermined region in which the information is erased at timings depending on the directions of the magnetic fields to record information.

In the second information recording device of the present invention, as will be described later, when the timings are appropriately set, the position of a magnetization transition point can be adjusted to cancel the HTS described above. For this reason, information recording at a high recording density is performed with a small error rate.

If an erasing head exclusively used to erase information is present independently of a recording head for recording information, for example, the recording head and the erasing head are formed at the distal end of the arm such that both the heads overlap. When the distal end is located on a track of the recording medium, the distal end is desirably located at the same position in the direction of track width. However, by a variation in the angle of the arm with movement of the distal end of the arm, the positions of the recording head and the erasing head at the distal end of the arm are offset from each other in the direction of track width. In this state, the recording capability of the recording head and the erasing capability of the erasing head are different from each other due to the angle of the arm.

In contrast to this, since the second information recording device of the present invention performs recording and erasing of information on/from the predetermined region, the information recording device needs only a simple configuration and is inexpensive, and recording and erasing can be appropriately performed without the positional shift.

In the second information recording device of the present invention, as in the first information recording device of the present invention, the magnetic head controller preferably controls the magnetic head to cause the magnetic head to apply magnetic fields to the small regions at least twice to erase information. In addition, the magnetic head controller preferably causes the magnetic head to apply a magnetic field which is stronger when information is erased than when information is recorded.

DETAILED DESCRIPTION OF PREFERRED EMBODIMENTS

An embodiment of the present invention will be described below.

Figure 1:
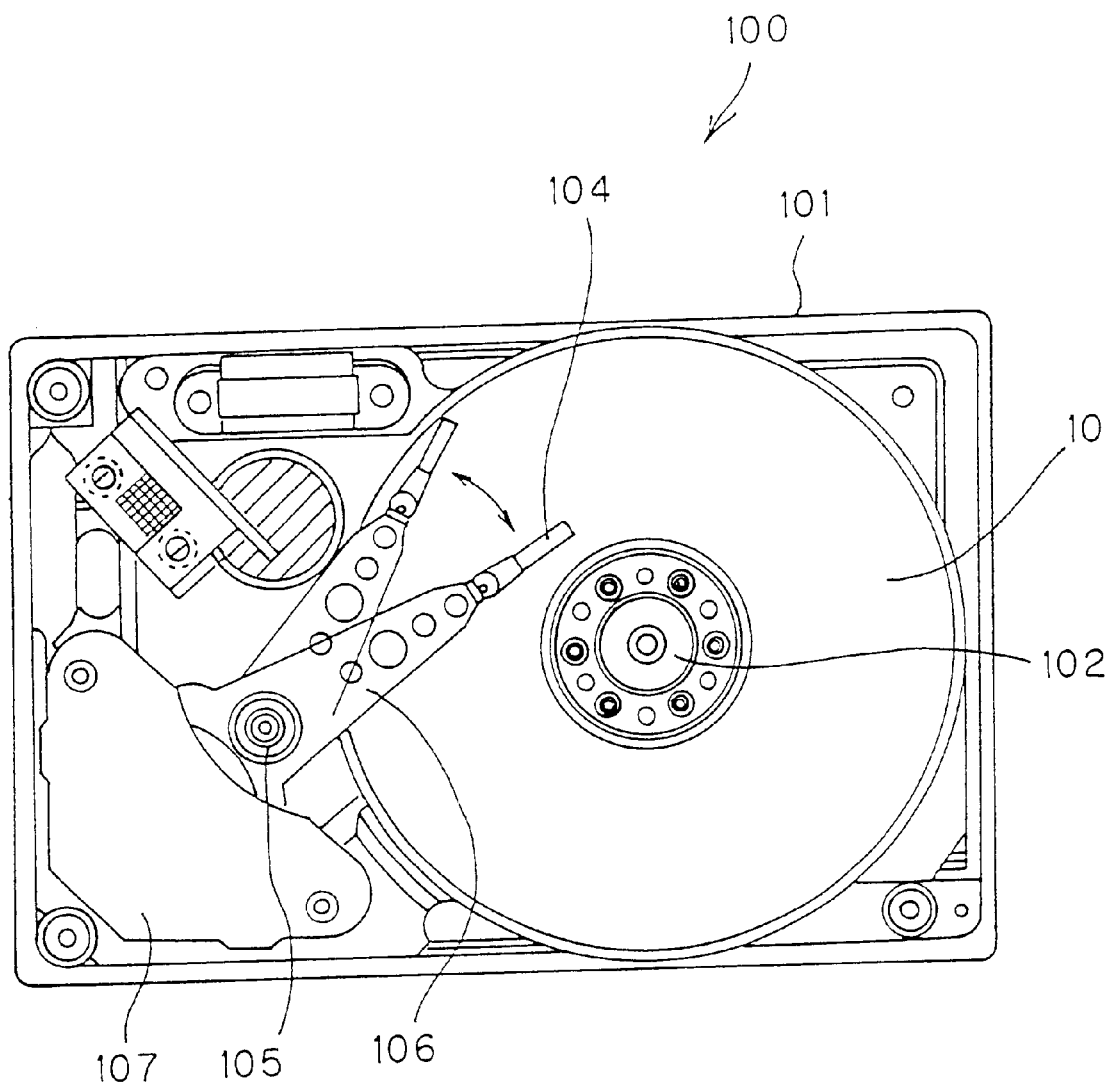
FIG. 1 is a diagram showing an embodiment of a hard disk drive according to the present invention.

FIG. 1 is diagram showing an embodiment of a hard disk drive according to the present invention.

A hard disk drive (HDD) 100 shown in FIG. 1 corresponds to an information recording device according to the present invention. In a housing 101 of the HDD 100 shown in FIG. 1, a rotating shaft 102, a magnetic disk 103 mounted on the rotating shaft 102, a floating head slider 104 opposing the magnetic disk 103, an arm shaft 105, a carriage arm 106 having the floating head slider 104 fixed to the distal end of the carriage arm 106 and horizontally moving on the magnetic disk 103 about the arm shaft 105, and an actuator 107 for driving the horizontal movement of the carriage arm 106 are accommodated.

In recording of information on a magnetic disk or reproduction of information stored in the magnetic disk 103, the carriage arm 106 is driven by the actuator 107 constituted by a magnetic circuit, and the floating head slider 104 is positioned at a desired track on the rotating magnetic disk 103. A composite magnetic head (not shown in FIG. 1) is arranged on the floating head slider 104. The composite magnetic head is constituted by a reproducing head and a recording head corresponding to a magnetic head mentioned in the present invention. With rotation of the magnetic disk 103, the composite magnetic head is sequentially close to small regions arrayed on the respective tracks of the magnetic disk 103. In recording of information, an electric recording signal is input to the recording head of the composite magnetic head being close to the magnetic disk 103, and the recording head applies magnetic fields to these small regions depending on the recording signal, so that information carried by the recording signal is recorded as directions of magnetization of the small regions. A DC erasing operation of information is also performed by the recording head. In the DC erasing operation of information, a predetermined DC current is continuously input to the recording head, and the magnetic head applies magnetic fields each having a predetermined intensity and each turned in one of predetermined directions in which tracks extend in the small regions, so that the directions of magnetization in the small regions are uniformed. In reproduction of information, information recorded as the directions of magnetization in the small regions are extracted as an electric reproduction signal generated depending on magnetic fields generated by the magnetization. The internal space of the housing 101 is closed by a cover (not shown). As a composite magnetic head 30 may be contact with the magnetic disk 103 through, e.g., a lubricant or the like.

Figure 2:
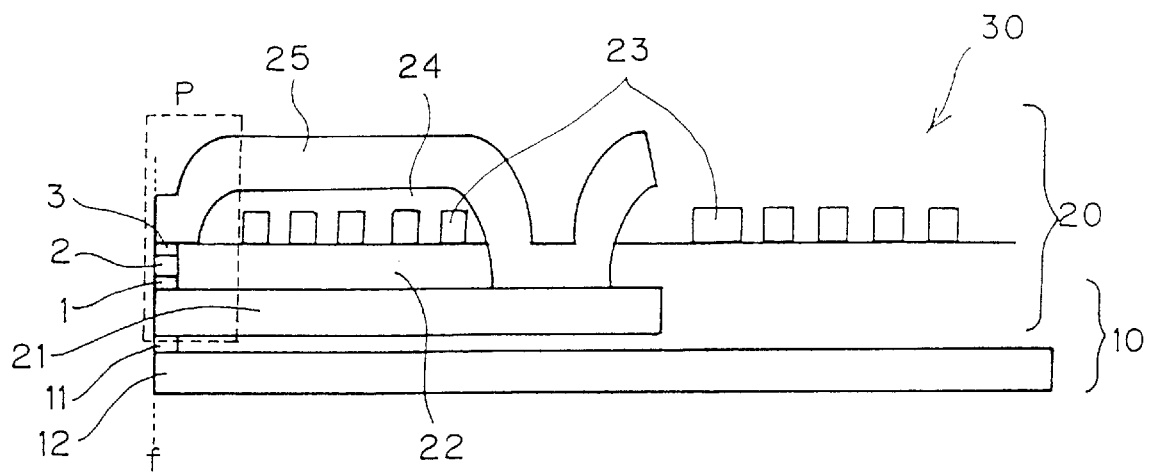
FIG. 2 is a side sectional view of a composite magnetic head used in the HDD according to the embodiment.
Figure 3:
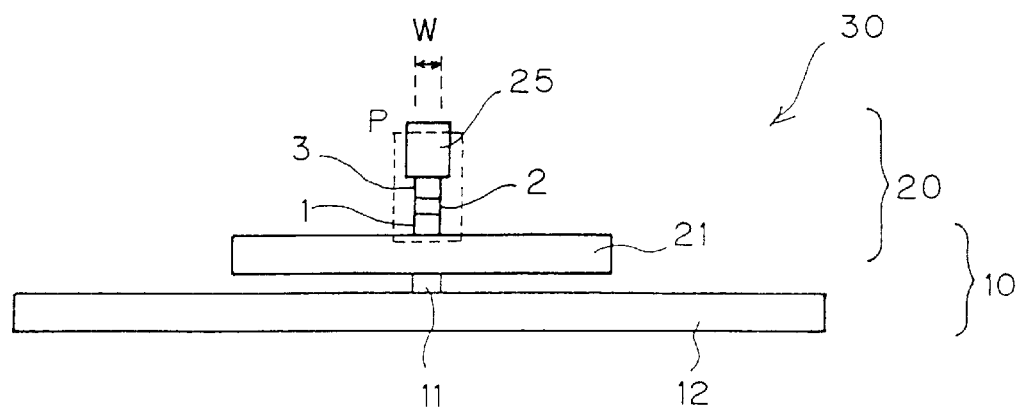
FIG. 3 is a floating surface view (front view) of the composite magnetic head used in the HDD according to the embodiment.

FIG. 2 is a side sectional view of a composite magnetic head used in the HDD according to the embodiment. FIG. 3 is a floating surface view (front view) of the composite magnetic head used in the HDD according to the embodiment. In this case, the floating surface is a surface of the composite magnetic head opposing a magnetic disk.

A composite magnetic head 30 shown in FIGS. 2 and 3 is positioned to be close to the magnetic disk 103 (not shown) in FIGS. 2 and 3 in the HDD 100. The composite magnetic head 30 shown in FIG. 2 faces the magnetic disk 103 on a floating surface f shown on the left side in FIG. 2. Since FIG. 3 shows the floating surface of the composite magnetic head, the composite magnetic head 30 shown in FIG. 3 faces the magnetic disk 103 at a front portion of FIG. 3.

As shown in FIGS. 2 and 3, the composite magnetic head 30 is roughly constituted by a reproducing head 10, and a recording head 20, and has a structure in which the recording head 20 is added to the reproducing head 10.

The reproducing head 10 has an element unit 11 which includes a magneto-resistance effect element or an electrode and which receives a magnetic field from the magnetic disk 103 to generate a reproduction signal depending on the magnetic field, a reproduction lower shield 12, and a reproduction upper shield 21. The reproduction lower shield 12 and the reproduction upper shield 21 consist of a soft magnetic material, and are arranged to sandwich the element unit 11 from both the sides in the direction of thickness of the element unit 11.

The recording head 20 has the lower magnetic pole 21 also serving as the reproduction upper shield 21 of the reproducing head 10, a first insulating layer 22 consisting of $Al_2O_3$ (alumina) and formed on the lower magnetic pole 21, a recording coil 23 consisting of Cu and formed on the first insulating layer 22, a second insulating layer 24 consisting of a resist covering the recording coil 23 and formed on the lower magnetic pole 21 and the recording coil 23, a main stacked film in which a lower sub-magnetic pole 1, a non-magnetic film 2, and an upper sub-magnetic pole 3 formed a portion near the floating surface f on the lower magnetic pole 21 are sequentially stacked, and an upper magnetic pole 25 formed to be stacked on the main stacked film, the second insulating layer 24, and the lower magnetic pole 21 at the central portion of the recording coil 23 near the center in FIG. 2.

The first insulating layer 22 is not limited to an insulating layer consisting of alumina. The first insulating layer 22 may consist of a non-magnetic insulating material except for alumina. The second insulating layer 24 is not limited to an insulating film consisting of a resist. The second insulating layer 24 may consist of a non-magnetic insulating material except for a resist.

The upper magnetic pole 25 and the lower magnetic pole 21, as shown in FIG. 2, forms a magnetic circuit which runs around the recording coil 23 through the central portion of the recording coil 23. A magnetic field generated by the recording coil 23 passes through the upper magnetic pole 25 and the lower magnetic pole 21, and leaks from the lower sub-magnetic pole 1 and the upper sub-magnetic pole 3 (to be described later) which face the magnetic disk 103 and are arranged near a portion where the lower magnetic pole 21 and the upper magnetic pole 25 opposite to each other to the outside. By the magnetic field leaked to the outside, the magnetizations of the small regions of the magnetic disk 103 described above are inverted.

The main stacked film constituting the main portion of the recording head 20 will be described below.

Figure 4:
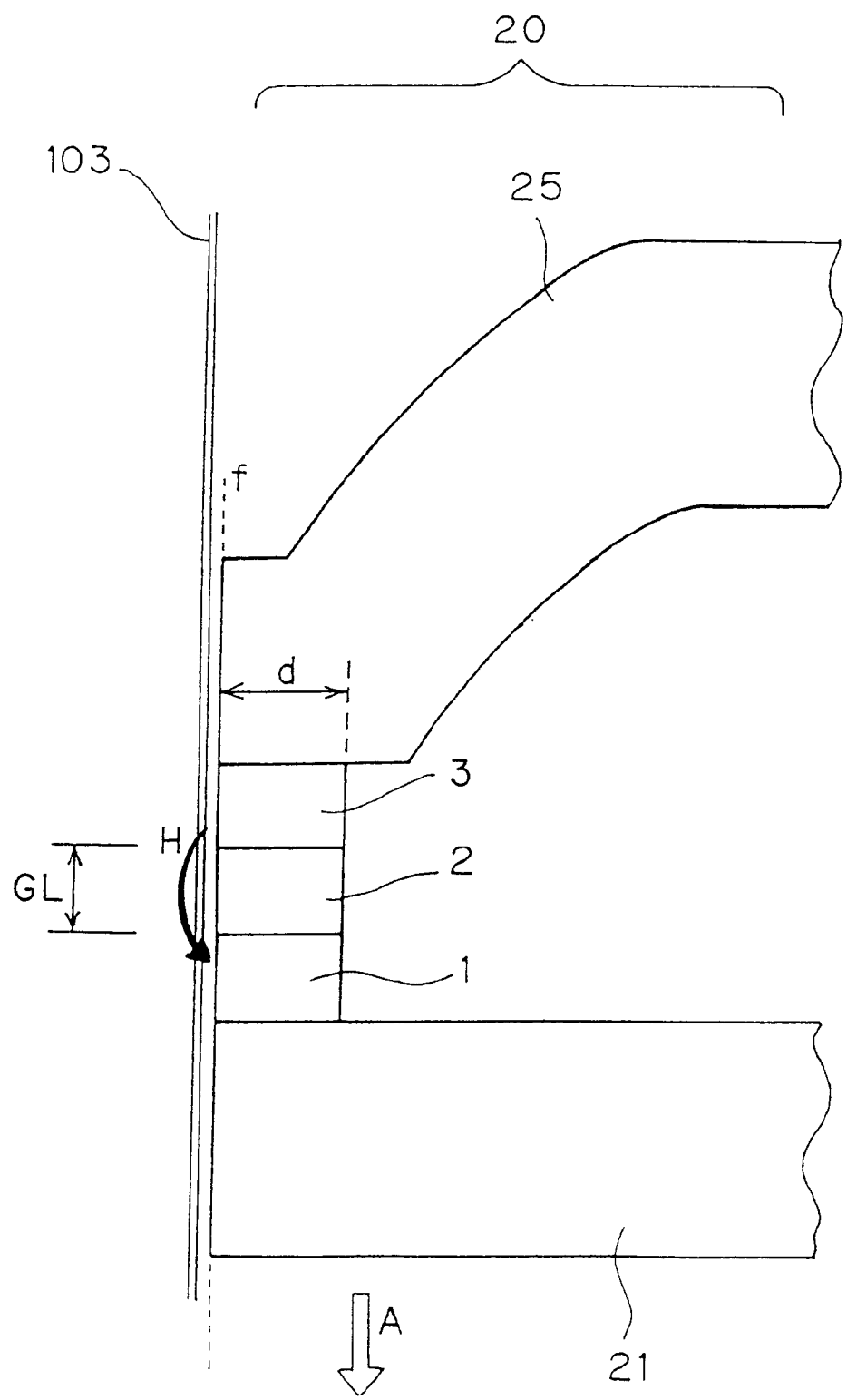
FIG. 4 is a side sectional view showing a recording head in the composite magnetic head shown in FIG. 2 near a main stacked film.

FIG. 4 is a side sectional view near the main stacked film of the recording head in the composite magnetic head shown in FIG. 2.

FIG. 4 is an enlarged sectional view of a portion P near the main stacked film surrounded by a dotted line on the left side in FIG. 4 in the recording head 20 in FIG. 2. FIG. 4 shows a manner in which the recording head 20 faces the magnetic disk 103 on the floating surface f of the recording head 20.

A portion shown in FIG. 4 in the recording head 20 is constituted by the lower magnetic pole 21, the lower sub-magnetic pole 1 stacked on the lower magnetic pole 21, the non-magnetic film 2 stacked on the lower sub-magnetic pole 1, the main stacked film constituted by the upper sub-magnetic pole 3 stacked on the non-magnetic film 2, and the upper magnetic pole 25 stacked on the main stacked film.

The lower magnetic pole 21 and the upper magnetic pole 25 are magnetic poles consisting of, e.g., an $Ni_{50}Fe_{50}$ (at %) having a thickness of 3 µm. The lower sub-magnetic pole 1 is a magnetic pole consisting of, e.g., an $Ni_{50}Fe_{50}$ having a thickness of 1 µm. The non-magnetic film 2 is a magnetic pole consisting of, e.g., an alumina film having a thickness of 0.1 µm, and the upper sub-magnetic pole 3 is a magnetic pole consisting of, e.g., an $Ni_{50}Fe_{50}$ having a thickness of 2 µm.

These thicknesses are only examples. The thicknesses of the lower magnetic pole 21, the upper magnetic pole 25, the respective sub-magnetic poles and the non-magnetic films constituting the main stacked film are not limited to the thicknesses described above.

The lower magnetic pole 21, the upper magnetic pole 25, the lower sub-magnetic pole 1, and the upper sub-magnetic pole 3 may consist of not only $Ni_{50}Fe_{50}$, but also a soft magnetic material such as $Ni_{80}Fe_{20}$ (at %), CoNiFe, or FeZrN, or may be a film obtained by stacking a plurality of films consisting of these soft magnetic materials including $Ni_{50}Fe_{50}$. The non-magnetic film 2 may consist of not only alumina, but also a non-magnetic material except for alumina.

The main stacked film is trimmed into a rectangular shape, and has a core width w of 0.5 μm in the direction of track width of the magnetic disk 103, i.e., in a direction of spread of the main stacked film on the floating surface view in FIG. 3 and a height d of 1.5 μm in a direction of height, i.e., in a direction perpendicular to the surface of the magnetic disk 103 on the side sectional view in FIG. 4. The gap length GL is regulated by an interval between the lower sub-magnetic pole 1 and the upper sub-magnetic pole 3, is set to be 0.1 μm here.

The values of the core width w, the height d, and the gap length GL are only examples, and are not limited to the values described above.

As shown in FIG. 4, the recording head 20 relatively moves with respect to the close magnetic disk 103 in the direction of a downward arrow A in FIG. 4. In this case, the lower sub-magnetic pole 1 is located on the side in a moving direction of the recording head 20, and the upper sub-magnetic pole 3 is located on the side opposing the moving direction.

FIG. 4 illustrates a magnetic field H leaking between the lower sub-magnetic pole 1 and the upper sub-magnetic pole 3. The directions of magnetization in the small regions of the magnetic disk 103 are appropriately inverted by the magnetic field H, and pieces of information are sequentially recorded.

As described in the prior art, when a new recording pattern is simply overwritten on the recording pattern of the previous magnetization, HTS occurs.

Figure 5:
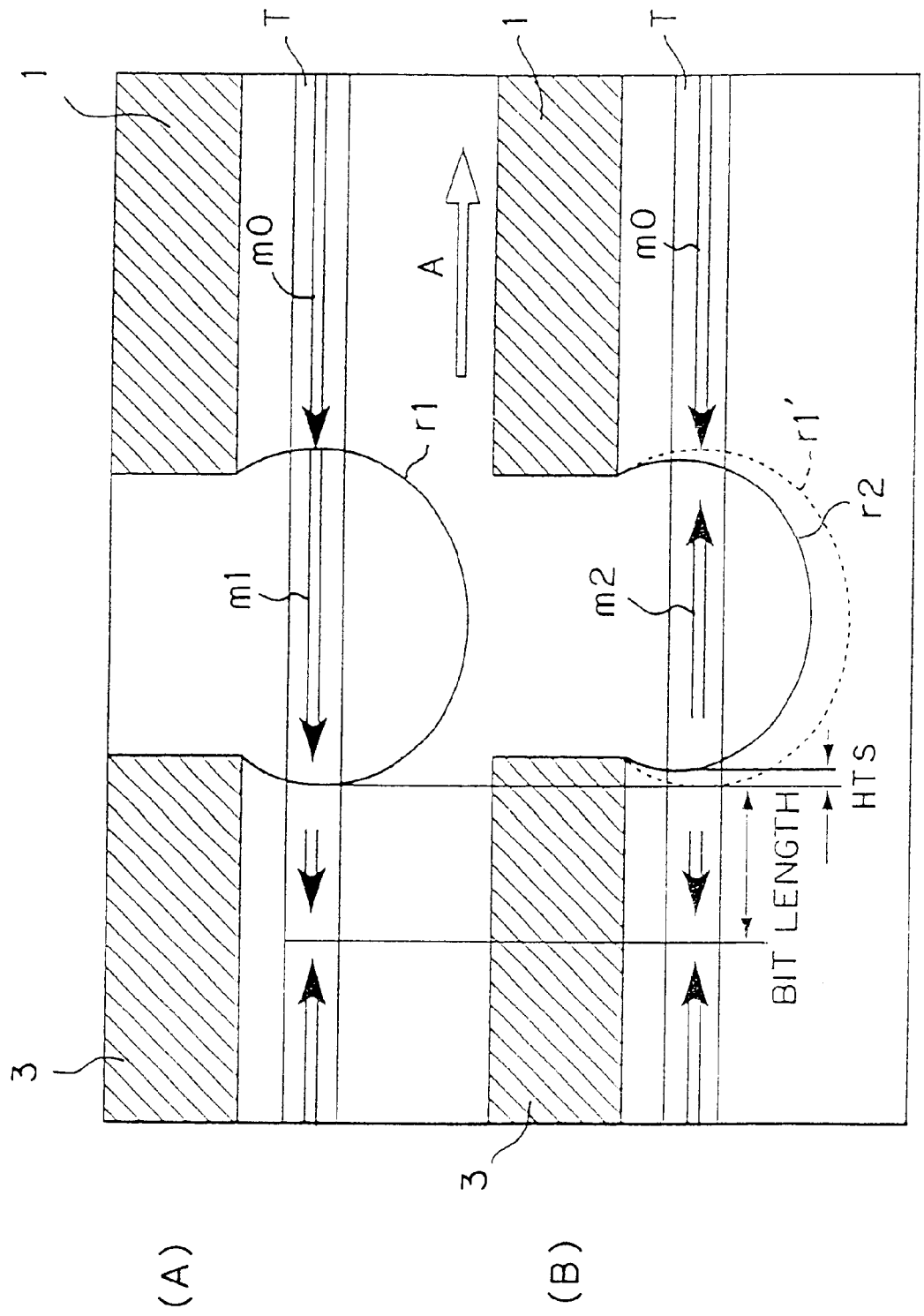
FIG. 5 is a diagram for explaining HTS.

FIG. 5 is a diagram for explaining the HTS.

Each of (A) and (B) in FIG. 5 shows a manner in which a magnetic field is applied from the lower sub-magnetic pole 1 and the upper sub-magnetic pole 3 onto one track of the magnetic disk 103. In either one of these drawings, the lower sub-magnetic pole 1 is shown on the right side in the drawing, the upper sub-magnetic pole 3 is shown on the left side in the drawing, and one track T of the magnetic disk 103 is shown in the sub-magnetic pole on the lower side in the drawing. These sub-magnetic poles relatively move in the direction of a right-direction arrow A with respect to the track T. In FIG. 5 and the following drawings, the direction of the arrow A in which the sub-magnetic pole moves is set as a direction which points at the front, and the direction opposing the direction of the arrow A is set as a direction which points at the rear. By the sub-magnetic poles, recording magnetic fields sequentially applied from the rear of the track T to the front of the track T. On the track T, the direction of recorded magnetization is expressed by a left-direction (backward) arrow or a right-direction (forward) arrow. Here, in the regions (shown in these drawings) of the track T, left-direction (backward) previous magnetizations exist.

A region surrounded by an arc-like solid line r1 in FIG. 5(A) represents a region in which a magnetic field leaking from the sub-magnetic pole of the recording head 20 is stronger than the coercive force $H_c$ of the magnetic disk 103. FIG. 5(A) shows a case in which a magnetic field applied in the backward direction, the previous magnetization of the track T is not inverted, and the direction of a magnetization m1 of the region surrounded by the solid line r1 is still backward like the magnetization m0 of a region which is in front of the region and to which a magnetic field is applied next. A region which is in the rear of the region is a region to which a magnetic field is applied, and the directions of the magnetizations of small regions partitioned in units of bit lengths of the track T are set to be a forward or backward direction.

A region surrounded by an arc-like broken line r1' in FIG. 5(B) is the same region as the region surrounded by the arc-like solid line r1 in FIG. 5(A). In contrast to the case in FIG. 5(A), FIG. 5(B) shows a case in which a magnetic field is forwardly applied. The previous magnetization of the track T is inverted to the forward direction. When the magnetization is inverted, a diamagnetic field is applied from a pole of magnetization to the region in which the magnetization is inverted. If the diamagnetic field does not exist, the region surrounded by the broken line r1' is an inverted magnetization region in which magnetization is inverted. However, by the diamagnetic field, the inverted magnetization region is reduced to a region which is smaller than the region surrounded by the broken line r1' and which is surrounded by an arc-like solid line r2. The HTS is a forward shift in a boundary on the backward side. This is because, as described above, since the region to which the recording magnetic field is applied moves from the rear to the front, the direction of magnetization in the boundary on the backward side is substantially determined. When HTS occurs, the peak position of a reproduction waveform shifts. For this reason, an error rate increases. Since the HTS is caused by the diamagnetic field, HTS occurs also when the intensity of the recording magnetic field of the recording head is sufficiently high.

The relationship between the HTS and the recording pattern of previous magnetization will be described below by using FIG. 6.

Figure 6:
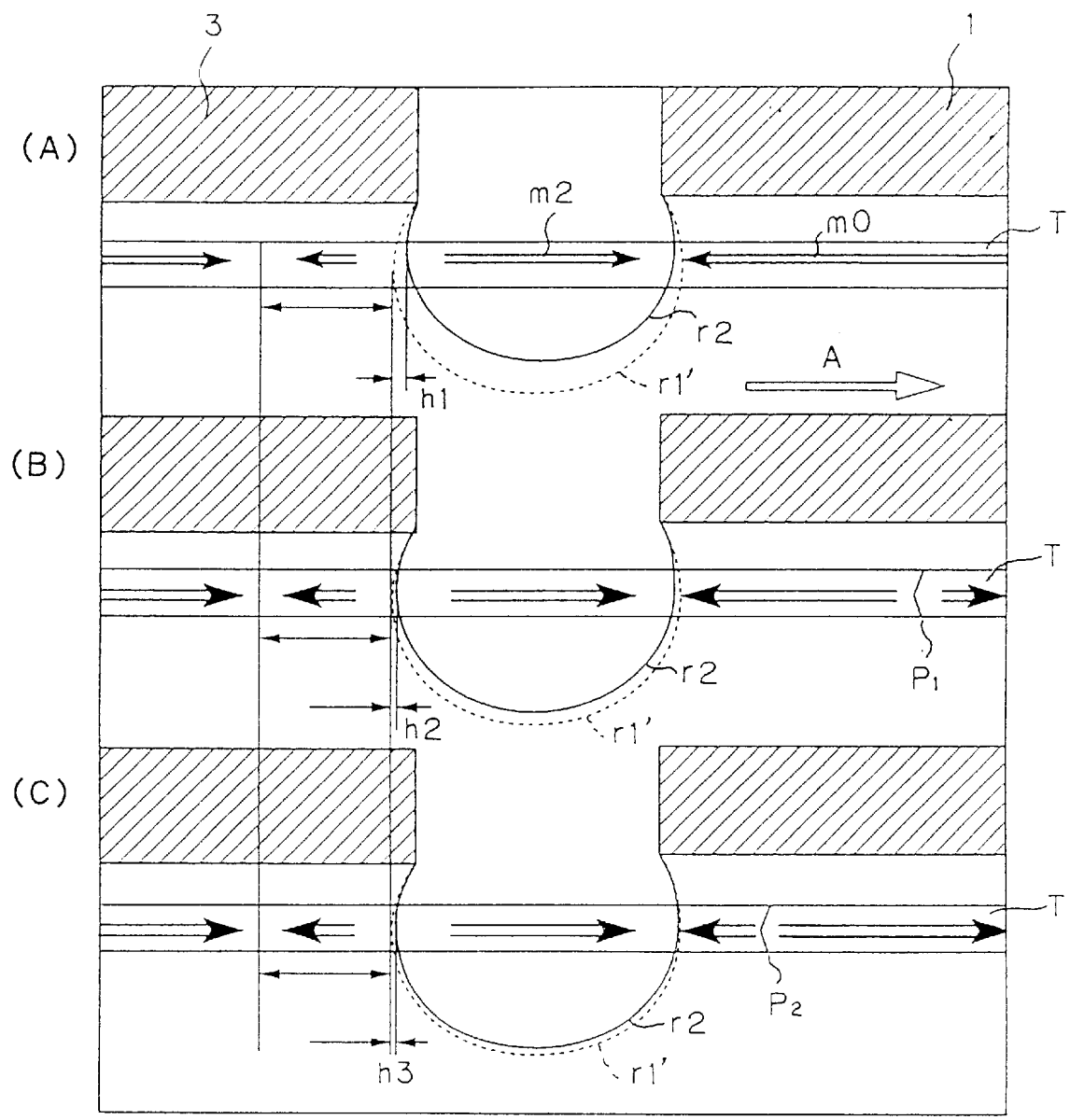
FIG. 6 is a diagram for explaining a change in the amount of shift of HTS caused by previous magnetization.

FIG. 6 is a diagram for explaining a change in the amount of shift of HTS caused by previous magnetization.

FIG. 6(A) is the same as FIG. 5(B). A magnetization m0 of a region in front of a region surrounded by an arc-like solid line r2 has a backward direction. The amount of shift of HTS is an amount of shift h1.

In FIG. 6(B), in comparison with FIG. 6(A), the following status is shown. That is, magnetization transition point p1 exists in a region in front of the inverted magnetization region surrounded by the arc-like solid line r2, the direction of magnetization is backward in the rear of the magnetization transition point p1, and the direction of magnetization is forward in front of the magnetization transition point p1. In the inverted magnetization region, a magnetic field acts from the magnetization transition point p1 in a direction in which the diamagnetic field caused by a magnetization transition point on the boundary of the inverted magnetization region is weakened. For this reason, the inverted magnetization region is larger than the inverted magnetization region in FIG. 6(A), and an amount of shift h2 of the HTS is smaller than the amount of shift hi shown in FIG. 6(A).

In FIG. 6(C), a magnetization transition point p2 which is closer to the inverted magnetization region than the magnetization transition point p1 shown in FIG. 6(B). Since a magnetic field acting from the magnetization transition point p2 to the inverted magnetization region is stronger than the magnetic field from the magnetization transition point p1, an inverted magnetization region in FIG. 6(C) is larger than the inverted magnetization region shown in FIG. 6(B), and an amount of shift h3 of HTS is smaller than the amount of shift h2 of the HTS shown in FIG. 6(B).

In this manner, the amount of shift of HTS changes depending on the recording pattern of previous magnetization. However, when a DC erasing operation is performed in advance to uniform previous magnetizations in one direction, the amount of shift of HTS has a predetermined value. In this manner, when the amount of shift has a predetermined value, the influence of HTS can be canceled by performing pre-recording correction (to be described by using FIGS. 7A to 7D). Although, in addition to the HTS, NLTS (Non-Linear Transition Shift) which is shift based on a diamagnetic field from a recording pattern recorded immediately before in the rear of the inverted magnetization region exists, the amount of shift of the NLTS can be predicted and can be corrected by pre-recording correction (to be described later).

FIGS. 7A to 7D are diagrams for explaining pre-recording correction.

FIG. 7A shows a state in which the track T is subjected to a DC erasing operation to uniform of magnetizations in the forward direction. FIG. 7B shows an example of a recording pattern of target magnetization recorded on the track T. Here, the recording pattern is a recording pattern in which forward, backward, forward, backward, and forward magnetizations are sequentially recorded from the rear of the track T. Magnetization transition points of the magnetizations on the target recording pattern are defined as points p1, p2, p3, and p4, respectively.

FIG. 7C shows an example of a recording current applied by using the recording pattern of magnetizations shown in FIG. 7B as a target. In the horizontal direction, times at which a boundary on the backward side in the regions indicated by the arc-like solid line r1 in FIG. 5 are plotted at positions on the track T. The vertical direction represents the magnitude of a recording current which is positive when a backward magnetic field is generated. Here, when the boundary on the backward side is located at a position from the rear to the point p1, a position from the point p1 to the point p2, a position from the point p2 to the point p3, a position from the point p3 to the point p4, and a position in front of the point p4, recording magnetic fields turned in the forward, backward, forward, backward, and forward directions are applied.

FIG. 7D shows a recording pattern of magnetizations actually recorded by the recording current shown in FIG. 7C. The recording pattern is different from the target recording pattern shown in FIG. 7B, of target magnetization transition points, magnetic transition points which are expected to be generated at the point p1 and the point p3 shift to forward points p1' and p3'. This shift is HTS occurring by applying a backward recording magnetic field to the forward previous magnetization. However, since the recording pattern is recorded on a track subjected to a DC erasing operation shown in FIG. 7A, all the amounts of shift of HTS occurring in the recording pattern have equal values.

The amounts of shift of the HTS are equal to each other as described above. For this reason, in place of the recording current shown in FIG. 7C, as shown in FIG. 7E, by using a corrected recording current subjected to pre-recording correction for hurrying a timing for changing the recording current to backwardly apply a magnetic field depending on the amount of shift of the HTS, as shown in FIG. 7F, a target recording pattern having magnetization transition points at the points p1, p2, p3, and p4 is formed even though HTS occurs.

A reproduction waveform which is free from shift can be obtained from the recording pattern in reproduction, and an error rate can be increased.

The function of the HDD 100 according to the embodiment in which shift is canceled by the pre-recording correction will be described below.

Figure 8:
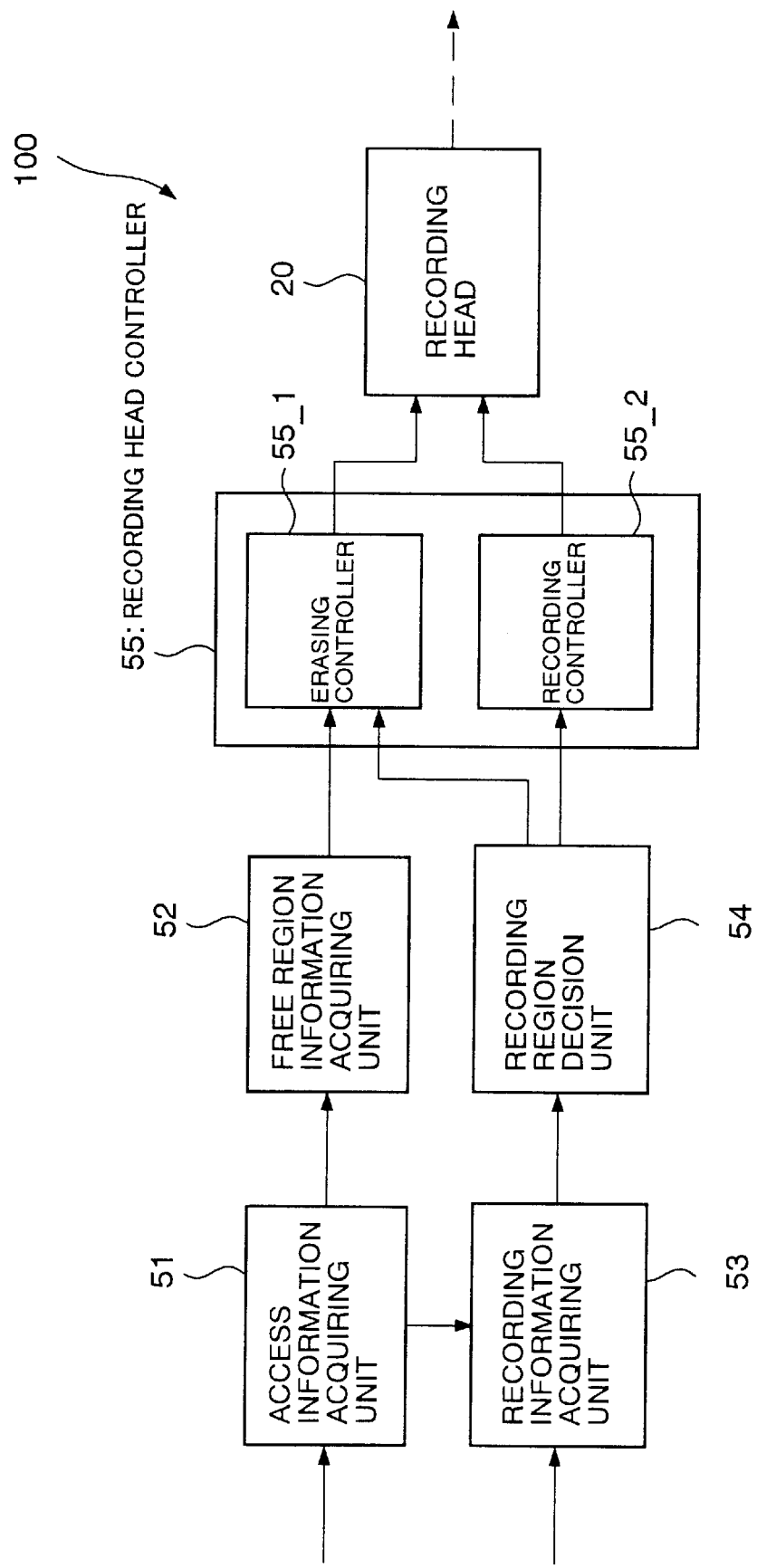
FIG. 8 is a functional block diagram of the HDD according to the embodiment.

FIG. 8 is a functional block diagram of the HDD according to the embodiment.

FIG. 8 shows an HDD 100 constituted by an access information acquiring unit 51, a free region information acquisition unit 52, a recording information acquisition unit 53, a recording region determination unit 54, a recording head controller 55, and a recording head 20. The recording head controller 55 corresponds to a magnetic head controller according to the present invention.

The access information acquiring unit 51 is to acquire access information representing whether the reproducing head 10 and the recording head 20 access the magnetic disk 103 to perform recording or reproducing or not.

The free region information acquisition unit 52 is to acquire position information of a free region serving as a region of a recording pattern which is actually left on the magnetic disk 103 but is permitted to be erased when it is determined by the information acquired by the access information acquiring unit 51 that both the recording and reproduction are not performed by the HDD 100 at present.

The recording information acquisition unit 53 is to acquire recording information representing a recording pattern recorded on the magnetic disk 103 from the outside of the HDD 100.

The recording region determination unit 54 determines a free region in which recording information acquired by the recording information acquisition unit 53 to acquire information representing whether the free region is subjected to a DC erasing operation or not. The recording region determination unit 54 may acquire the information of a region subjected to a DC erasing operation on the magnetic disk 103, and may determine a region in which the recording information is recorded from the region subjected to a DC erasing operation.

The recording head controller 55 is constituted by an erasing controller 55_1 and a recording controller 55_2.

When the erasing controller 55_1 receives the position information acquired by the free region information acquisition unit 52, the erasing controller 55_1 controls the recording head 20 to cause the recording head 20 to apply magnetic fields to small regions in a region represented by the position information to uniform the directions of magnetization of the small regions, thereby erasing information of the region represented by the position information. When the region determined by the recording region determination unit 54 is not subjected to a DC erasing operation, the erasing controller 55_1 controls the recording head 20 to cause the recording head 20 to apply magnetic fields to small regions in an unerased region which is not subjected to a DC erasing operation to uniform the directions of magnetization of the small regions, thereby erasing information in the unerased region.

Figure 7:
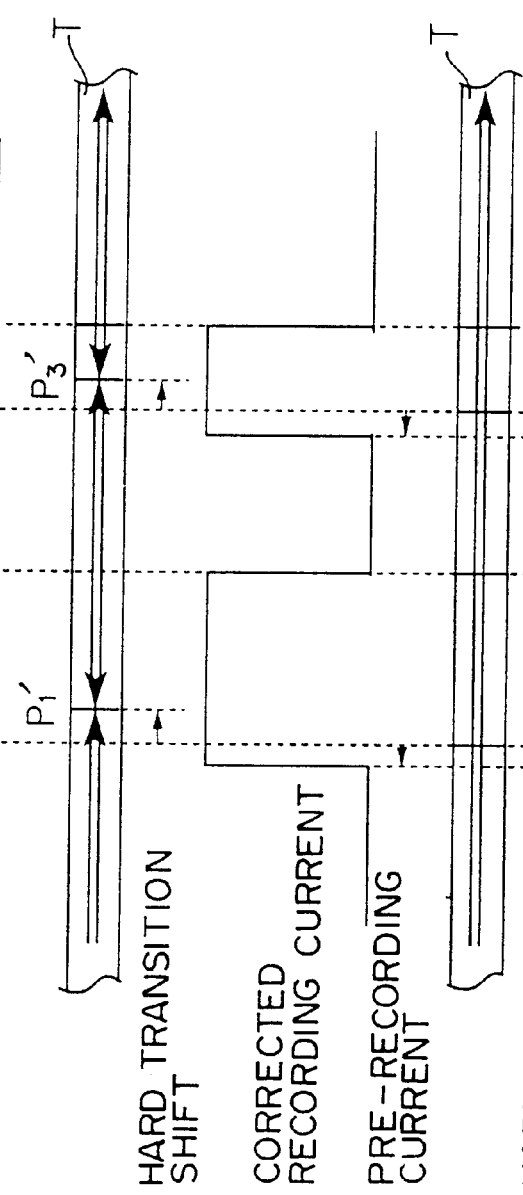
FIGS. 7A to 7D are diagrams for explaining correction before recording.

When the region determined by the recording region determination unit 54 is subjected to a DC erasing operation, the recording controller 55_2 controls the recording head 20 to cause the recording head 20 to apply magnetic fields to small regions of the region in which the information is erased, by using the corrected recording current described with reference to FIG. 7 at timings depending on the directions of the magnetic fields, thereby recording information.

Figure 9:
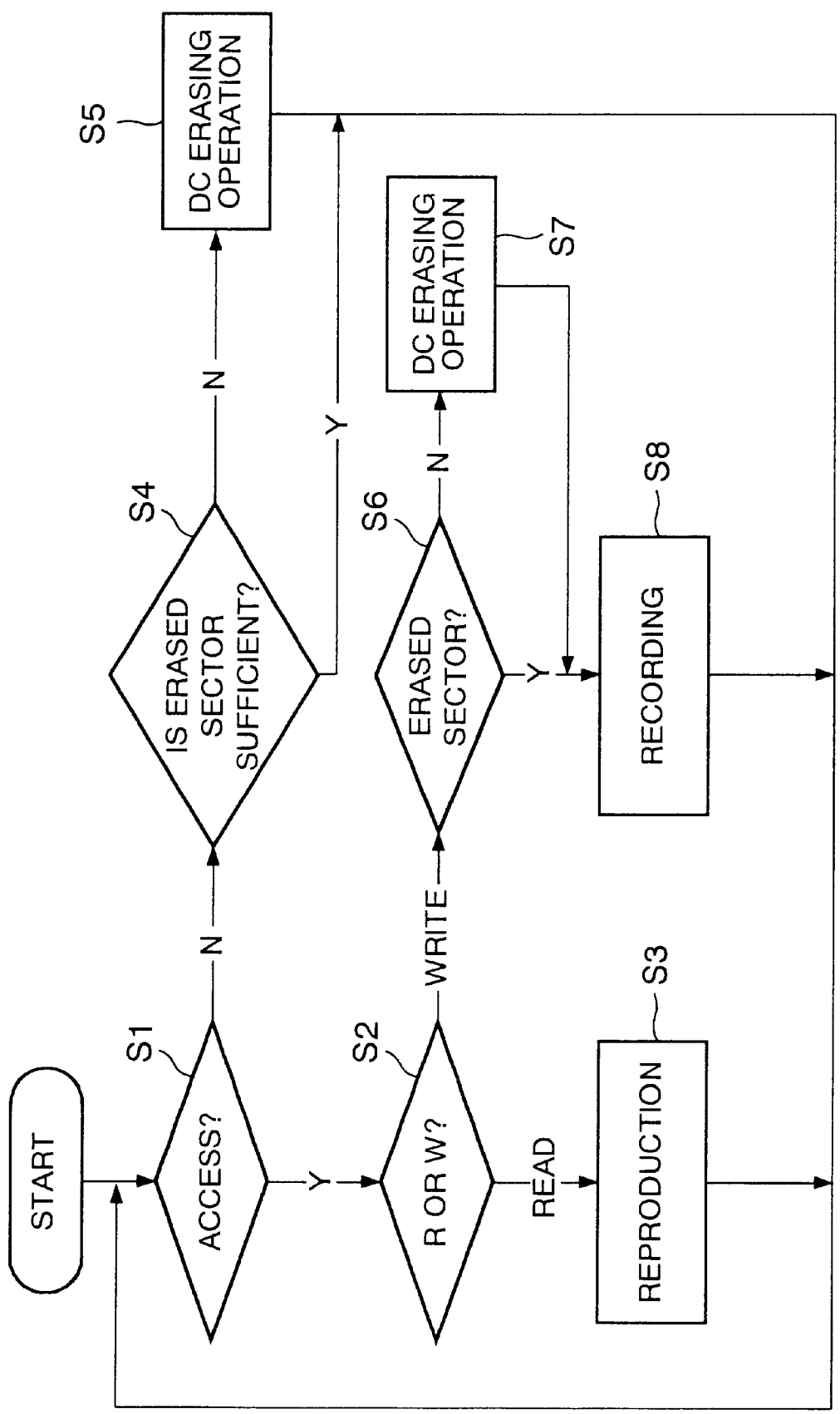
FIG. 9 is a flow chart of erasing and recording of information.

The operation of the recording head 20 controlled by the recording head controller 55 is arranged in the flow chart shown in FIG. 9 together with the operation of the reproducing head 10.

FIG. 9 is a flow chart of recording and reproducing of information.

In step S1, if access information acquired by the access information acquiring unit 51 represents that access is performed, the flow shifts to step S2. If the access information represents that access is not performed, the flow shifts to step S4 to step S5.

In step S2, if the access information represents reproduction (Read) performed by the reproducing head 10, the flow shifts to step S3. If the access information represents recording (Write), performed by the recording head 20, the flow shifts to steps S6 to S8.

In step S3, the information in the magnetic disk 103 is read by the reproducing head 10 to reproduce the information.

In steps S4 to S5, if a region subjected to a DC erasing operation is sufficiently large in a free region whose position is regulated by the information acquired by the free region information acquisition unit 52, the flow returns to step S1. If the region is not sufficiently large, the erasing controller 55_1 causes the recording head 20 to perform a DC erasing operation of a region which is not subjected to a DC erasing operation in the free region of the magnetic disk 103. When the DC erasing operation is completed, the flow returns to step S1.

In steps S6 to S8, the recording region determination unit 54 acquires information representing whether a free region serving as a write target of the magnetic disk 103 is subjected to a DC erasing operation or not. If the free region is subjected to a DC erasing operation on the basis of acquired information, the erasing controller 55_1 causes the recording head 20 to record information in the free region subjected to a DC erasing operation. If a region which is not subjected to a DC erasing operation exists, the recording controller 55_2 causes the recording head 20 to record information in the region after the region is subjected to a DC erasing operation. Here, the recording of the information is performed such that magnetic fields are applied at timings adjusted as described with reference to FIG. 7. Through step S1 to step S8, erasing and recording of information from/on the magnetic disk 103 and reproduction of information from the magnetic disk 103 are performed.

As described above, the HDD 100 according to the present invention can adjust the position of the magnetization transition point to cancel the HTS by appropriately setting timings at which recording magnetic fields are applied onto a region subjected to a DC erasing operation on the magnetic disk 103. For this reason, recording of information at a high recording density is performed with a low error rate.

The HDD 100 causes one recording head 20 having a pair of magnetic poles to perform recording and erasing of information on/from the magnetic disk 103. For this reason, in comparison with a case in which recording and erasing are performed by different magnetic heads such that recording and erasing are performed by a recording head and an erasing head, respectively, the HDD 100 needs only a simple configuration and is inexpensive.

Since a head which is conventionally determined as a defective head with respect to an O/W can be used, a production yield of heads is increased.

If an erasing head dedicated to information erasing exists independently of the recording head 20 for recording information, for example, the recording head 20 and the erasing head are desirably formed at the distal end of the carriage arm 106 such that the recording head 20 and the erasing head overlap, and are desirably located at the same position in the direction of track width when the distal end is located on a track of the magnetic disk 103. However, by a variable in angle of the carriage arm 106 with movement of the distal end, the positions of the recording head 20 and the erasing head are offset from each other in the direction of track width. In this state, the recording capability of the recording head 20 and the erasing capability of the erasing head are different from each other depending on the angle of the carriage arm 106. In contrast to this, since the HDD 100 according to the embodiment performs recording and erasing of information by using one recording head 20, such a positional offset does not occur, and recording and erasing can be appropriately performed.

The HDD 100 of the embodiment may stop an erasing process and perform a recording/reproducing process when an event of recording/reproduction occurs even in a DC erasing process. When a DC erasing process is performed in a sufficient region by using a period of standby time in which recording/reproduction of information is not performed, the DC erasing process needs not be performed in information recording, and recording can be performed in a shorter time.

In the HDD 100 of the embodiment, the recording head controller 55 preferably causes the recording head 20 to apply a magnetic field stronger when a DC erasing operation is performed than when information is recorded. In the HDD 100, the recording head controller 55 preferably causes the recording head 20 to apply a magnetic field at least twice when a DC erasing operation of information is performed.

Information is sufficiently erased by applying a strong magnetic field or repeating application of a magnetic field at least twice.

Figure 10:
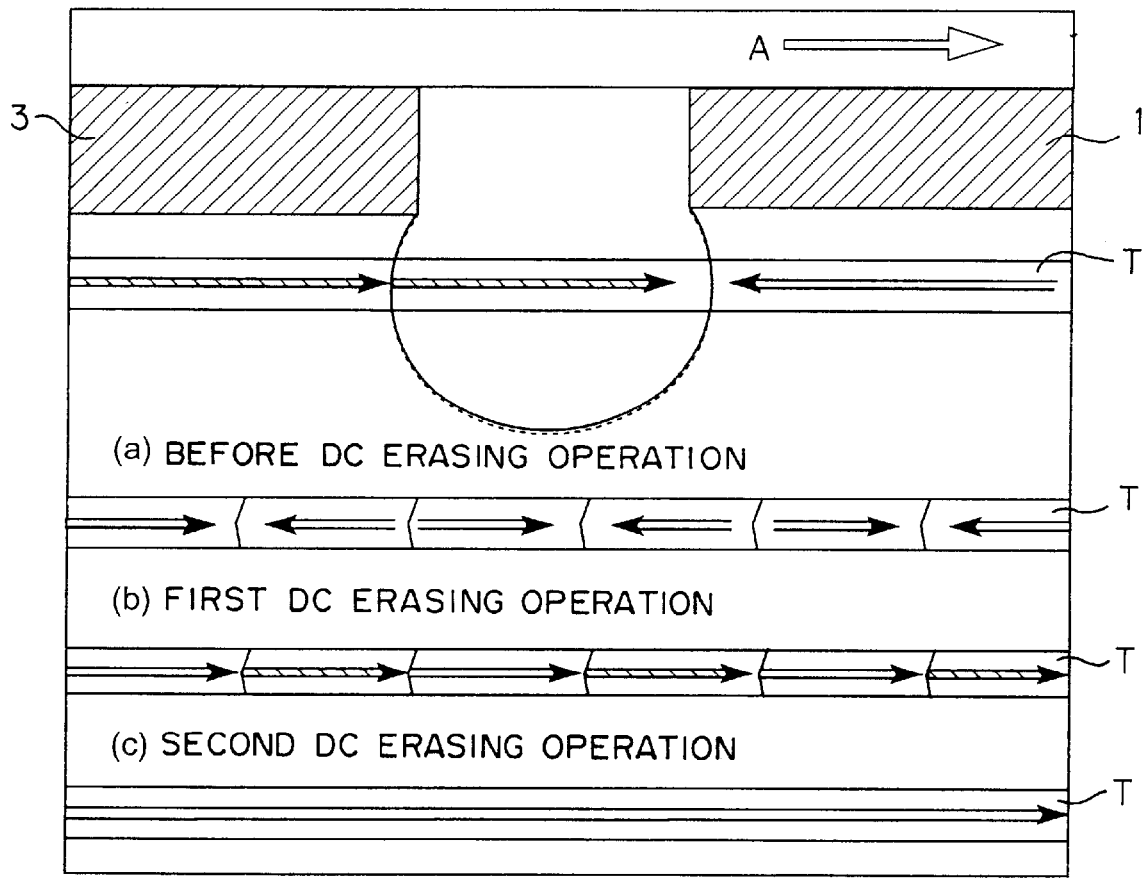
FIG. 10 is a diagram for explaining a repeated DC erasing operation.

FIG. 10 is a diagram for explaining a repeated DC erasing operation.

In the upper half of FIG. 10, as in FIG. 5(A), a manner in which a magnetic field is applied from one pair of sub-magnetic poles progressing in the forward direction indicated by an arrow A to a track T is shown. In the lower half of FIG. 10, (a) a recording pattern of magnetization before a DC erasing operation, (b) a recording pattern of magnetization after the first DC erasing operation, and (c) a recording pattern of magnetization after the second DC erasing operation are shown.

Here, in the recording pattern (a) of magnetization before the DC erasing operation, a plurality of magnetizations are alternately arranged in the forward and backward directions. When the recording pattern is subjected to the first DC erasing operation in which a forward magnetic field is applied from the pair of sub-magnetic poles, the recording pattern (b) in which the backward magnetizations in the recording pattern (a) are inverted is obtained. These inverted magnetizations may not be saturated due to the influence of the diamagnetic field of the original recording pattern. In this case, a recording pattern of previous magnetization is left although the recording pattern is weak, information is insufficiently erased. Therefore, in this case, furthermore, when the second DC erasing operation in which a forward magnetic field is applied from the pair of sub-magnetic poles is performed, the magnetization which is not completely saturated becomes the recording pattern (c) which is forwardly saturated. In this manner, information is more sufficiently erased by performing a DC erasing operation at least twice.

Even in a recording device using a recording medium such as a magnetic tape or a floppy disk, recording may be performed after a DC erasing operation. However, these recording media are coating type media, and has thick magnetic layers. For this reason, a DC erasing operation for these recording media is performed for, as a main object, an improvement in recording efficiency by performing erasing to the deep position of the magnetic layer. In contrast to this, in the HDD 100 of the embodiment, the film thickness of a magnetic layer of the magnetic disk formed by a thin film process such as sputtering is sufficiently smaller than the gap length GL of the recording head 20, and a DC erasing operation is performed for an improvement in error rate as a main object.

EXAMPLES

An example of the present invention will be described below.

The error rate can be evaluated by an O/W (Overwrite characteristics) of recording of information on a magnetic disk by a recording head, i.e., a ratio of a reproduction output of remaining information which is not overwritten to a reproduction output of information which is newly recorded. When the amount of shift of HTS is small, both the O/W and the error rate are small. However, when the amount of shift of the HTS is large, both the O/W and the error rate are large.

<Recording Density Dependency of O/W>

A simulation result of recording density dependency of an O/W obtained by an overwrite model calculation will be described below. In the overwrite calculation, a recording pattern of magnetization of a magnetic disk is modeled by placing a magnetic charge on a magnetization transition point of the recording pattern, and the amount of shift of the magnetization transition point when a recording magnetic field is applied to the recording pattern is calculated. On the basis of the amount of shift, the O/W is calculated. The details of the overwrite calculation is described in "Journal of The Magnetics Society of Japan" vol. 24, p351 (2000). Here, this overwrite model calculation was performed such that overwrite recording by an HDD including a magnetic disk in which a coercive force $H_c$ was 288 kA/m, a magnetic film had a thickness t of 17 nm, and a product tBr of the thickness of the magnetic film and a residual magnetic flux density was 0.06 T$\mu$m and a magnetic head having a write core width of 0.3 $\mu$m was supposed. A magnetic distance t+d/2 which is the sum of a distance t between the floating surface of the recording head and the surface of the magnetic layer of the magnetic disk and a half d/2 of the thickness of the magnetic layer is assumed as 30 nm without a specific notice. The magnitude of the gap length GL of the recording head will be properly described.

Figure 11:
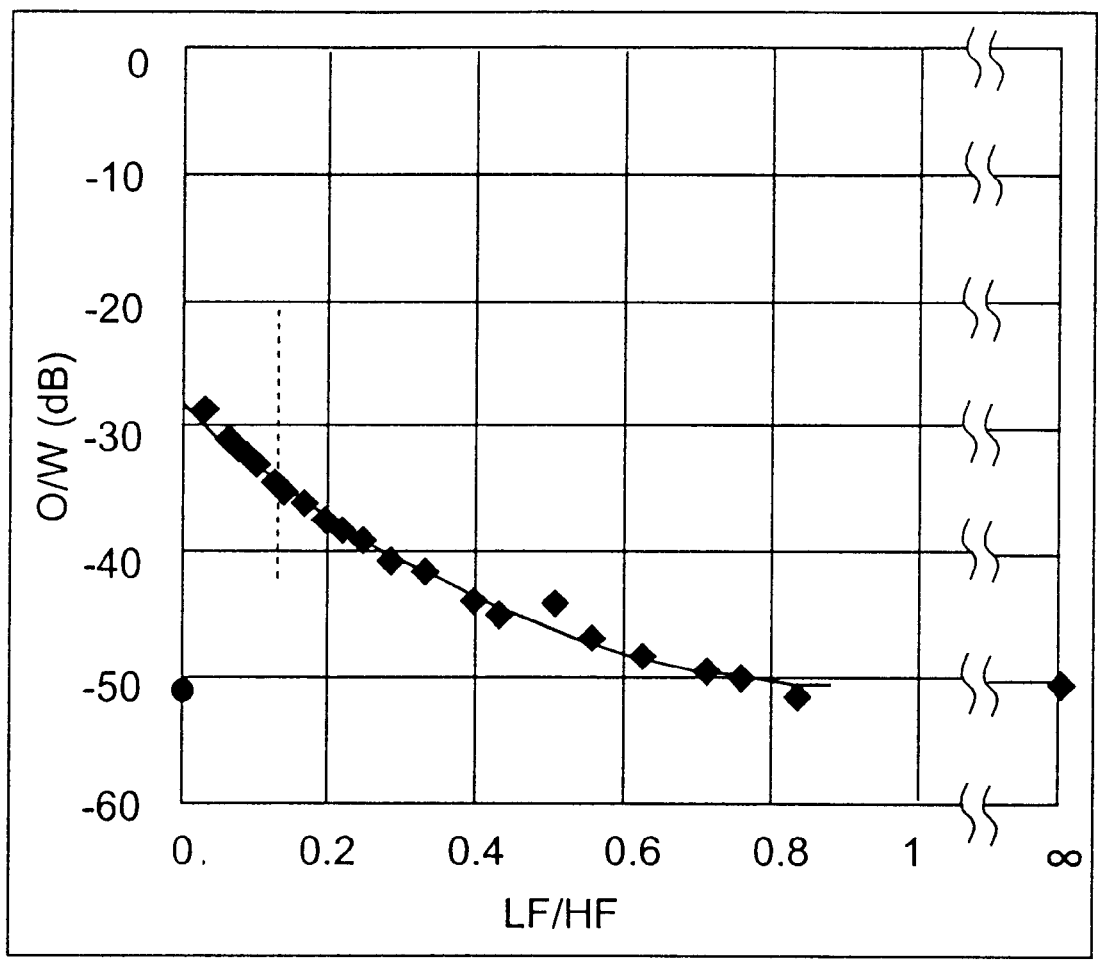
FIG. 11 is a first graph showing the recording density dependency of an O/W.

FIG. 11 is a first graph showing the recording density dependency of an O/W.

The abscissa of FIG. 11 indicates a ratio LF/HF of an under-write frequency LF representing the track recording density of a recording pattern of previous magnetization to an overwrite frequency HF representing a track recording density of a recording pattern overwritten on the recording pattern recorded at the under-write frequency LF. Here, the overwrite frequency HF is set to be 482 kfci (kilo flux changes per inch) to change the under-write frequency. The ordinate of FIG. 11 indicates the O/W of the recording pattern over-written in such a manner. In FIG. 11, the calculation results of the O/W are expressed by a plurality of small lozenges. A curve in the drawing indicates a result obtained by performing least square approximation of the calculation results of the O/W. The calculation results are obtained when the gap length GL is 0.25 $\mu$m.

As shown in FIG. 11, the O/W is −28 dB when the ratio LF/HF=0.02, monotonously decreases with an increase in the ratio LF/HF, and decreases to −51 dB when the ratio LF/HF=∞. In this manner, the O/W depends on the recording density, and the O/W decreases with an increase in the under-write frequency LF. This is because the amount of shift of HTS in overwrite recording decreases since a diamagnetic field for weakening a recording magnetic field decreases as the recording pattern of previous magnetization on the magnetic disk is dense (as the under-write frequency LF is high) as described with reference to FIG. 6.

Since a ratio of the maximum frequency of a recording current and the minimum frequency of the recording current changes depending on a coding method, it seems as if the O/W of the recording head is changed by the coding method. For example, in case of 16/17 coding method, the ratio of the maximum frequency to the minimum frequency is 8:1 at most. This maximum ratio corresponding to LF/HF=0.125 indicated by a dotted line in FIG. 11. An O/W in this case is about −35 dB.

LF/HF→∞ corresponds to a case in which a DC erasing operation is performed. In this case, an O/W of −51 dB is obtained, and it is understood that the previous information is sufficiently erased.

A result indicated by a black circle represents a case in which pre-recording correction is performed after the DC erasing operation. As described with reference to FIG. 7, when the pre-recording correction is performed after the DC erasing operation, the under-write frequency LF becomes 0 due to the DC erasing operation. For this reason, LF/HF=0 is satisfied. Since the pre-recording correction is performed, shift of a magnetization transition point caused by the HTS does not substantially occur, and O/W becomes −51 dB which is equal to the value obtained when LF/HF→∞.

Figure 12:
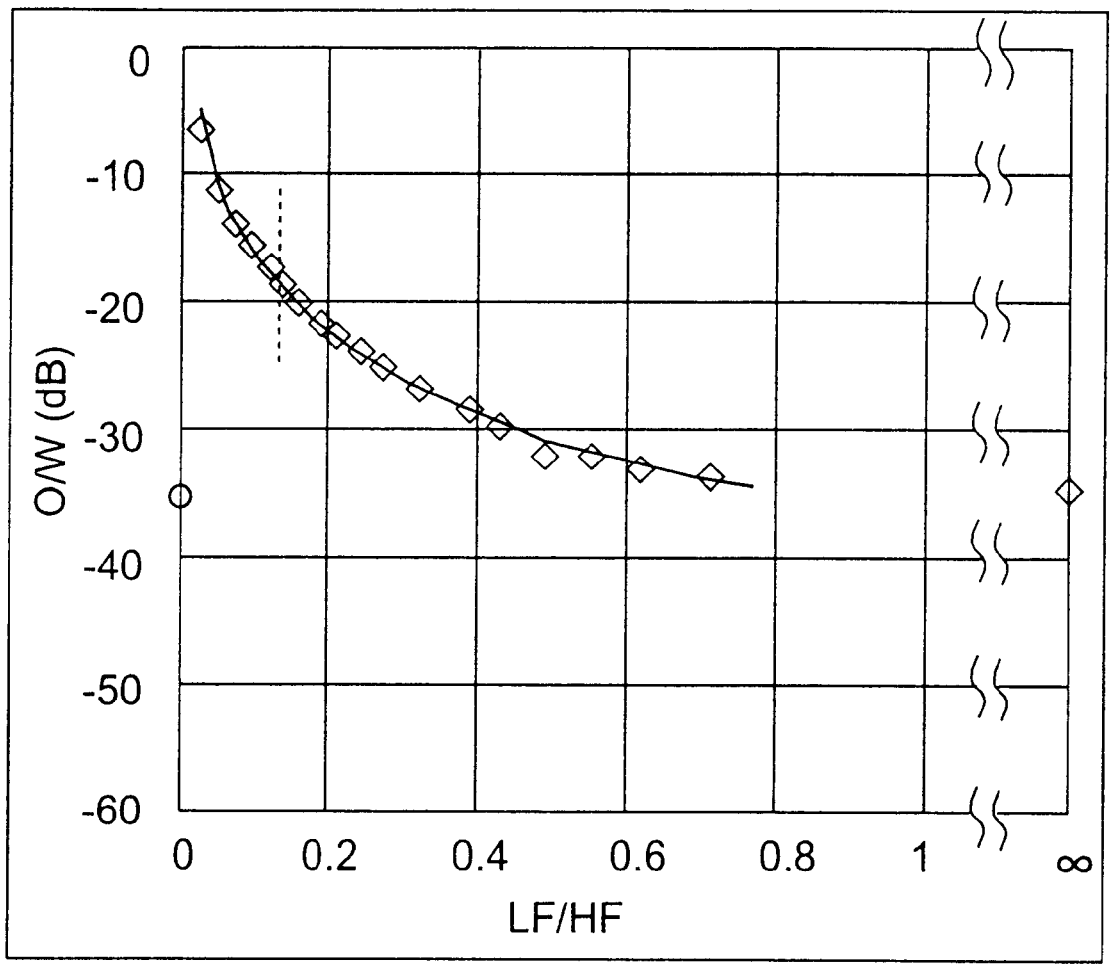
FIG. 12 is a second graph showing the recording density dependency of an O/W.

FIG. 12 is a second graph showing the recording density dependency of an O/W.

FIG. 12 is a graph showing recording density dependency of an O/W as in FIG. 11. This graph is different from the graph in FIG. 11 in that the graph in FIG. 12 shows a result of model calculation performed such that a recording head having a gap length GL of 0.1 $\mu$m which is smaller than the gap length GL of the model calculation shown in FIG. 11 is supposed.

As shown in FIG. 12, the O/W is −7 dB when the ratio LF/HF=0.02, monotonously decreases with an increase in the ratio LF/HF, and decreases to −35 dB when the ratio LF/HF=∞. Therefore, in the HDD in this model calculation, in case of 16/17 code method, only an O/W of about −15 dB to −20 dB is obtained. This value is larger than −30 dB. However, even in the HDD having the large O/W, when a DC erasing operation is performed before recording, and a pre-recording correction is performed after the DC erasing operation, the HDD can be used as an HDD having an O/W of −35 dB as indicated by a white circle in FIG. 12.

Figure 13:
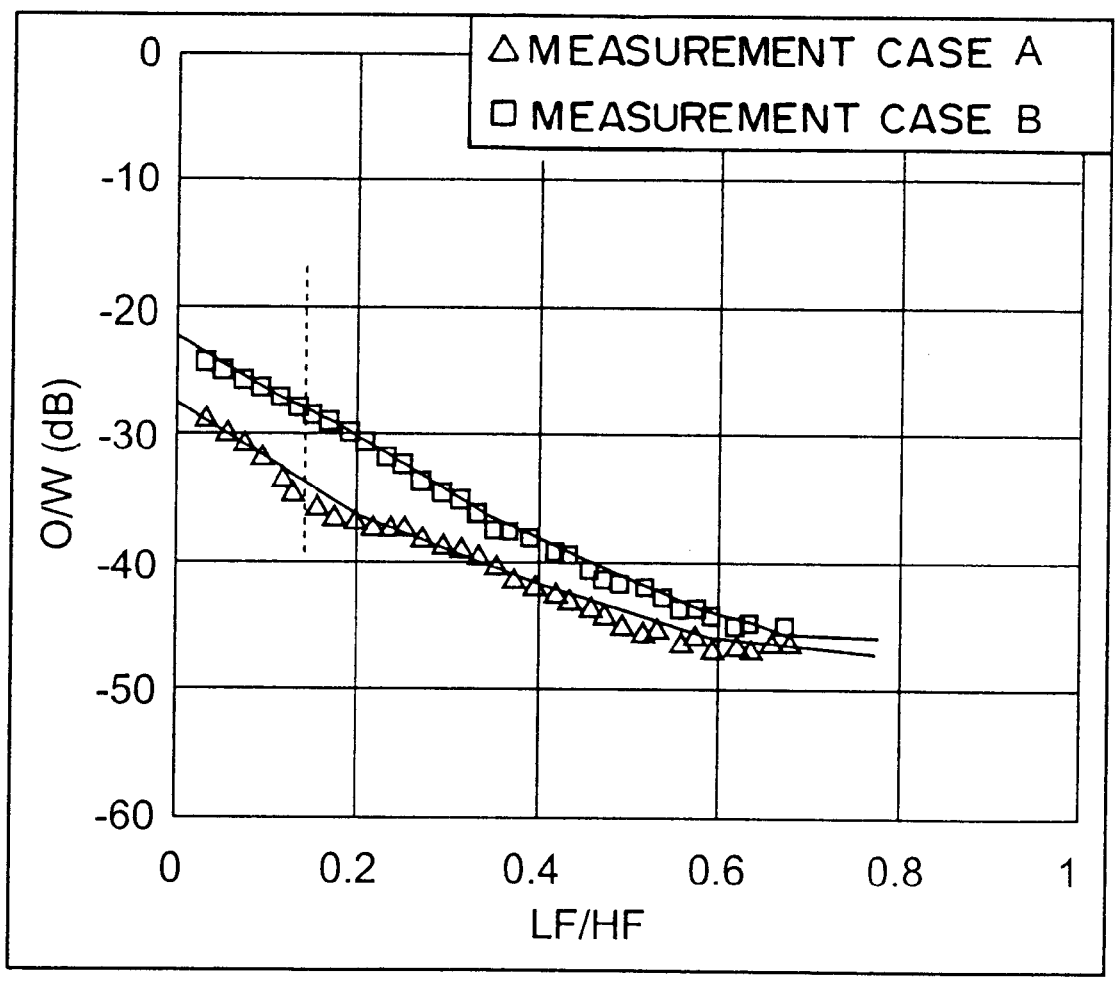
FIG. 13 is a third graph showing the recording density dependency of an O/W.

FIG. 13 is a third graph showing the recording density dependency of an O/W.

FIG. 13 is also a graph showing the recording density dependency of an O/W like FIG. 11 and FIG. 12. However, unlike the model calculations shown in FIG. 11 and FIG. 12, FIG. 13 shows the observed value of the recording density dependency of the O/W. Here, measurements are performed to two HDDs, respectively. These measurements are defined as a measurement case A and a measurement case B, respectively. In FIG. 13, the results of the measurement case A is indicated by a plurality of white triangles, and the results are indicated by a plurality of white rectangles. The gap lengths GL of recording heads used in both the measurements are 0.3 μm. In the measurement case B, a recording current for generating a recording magnetic field is intentionally reduced to weaken the recording magnetic field.

As these measurement results, in any case, an O/W decreases with an increase in a ratio LF/HF like the results of the above model calculation. In the measurement case A, the ratio LF/HF=0.125, and the O/W is −35 dB which is smaller than −30 dB. However, in the measurement case B, the ratio LF/HF=0.125, and the O/W is −28 dB which is larger than −30 dB. For this reason, in this state, the head of the HDD in the measurement case B is determined as a defective head which is not properly used. However, in the measurement case B, the ratio LF/HF>0.6, and the O/W is equal to or smaller than −43 dB, in the HDD, a DC erasing operation is performed before recording, and pre-recording correction is performed after the DC erasing operation. For this reason, it is understood that the O/W is reduced and improved in comparison with the O/W obtained in the 16/17 coding method. Also in the measurement case A, the O/W is equal to or smaller than −46 dB when the ratio LF/HF>0.6. For this reason, it is understood the O/W is improved in the same manner as described above.

<Gap Length Dependency of O/W>

A simulation result of the gap length GL dependency of an O/W obtained by an overwrite model is described below.

Figure 14:
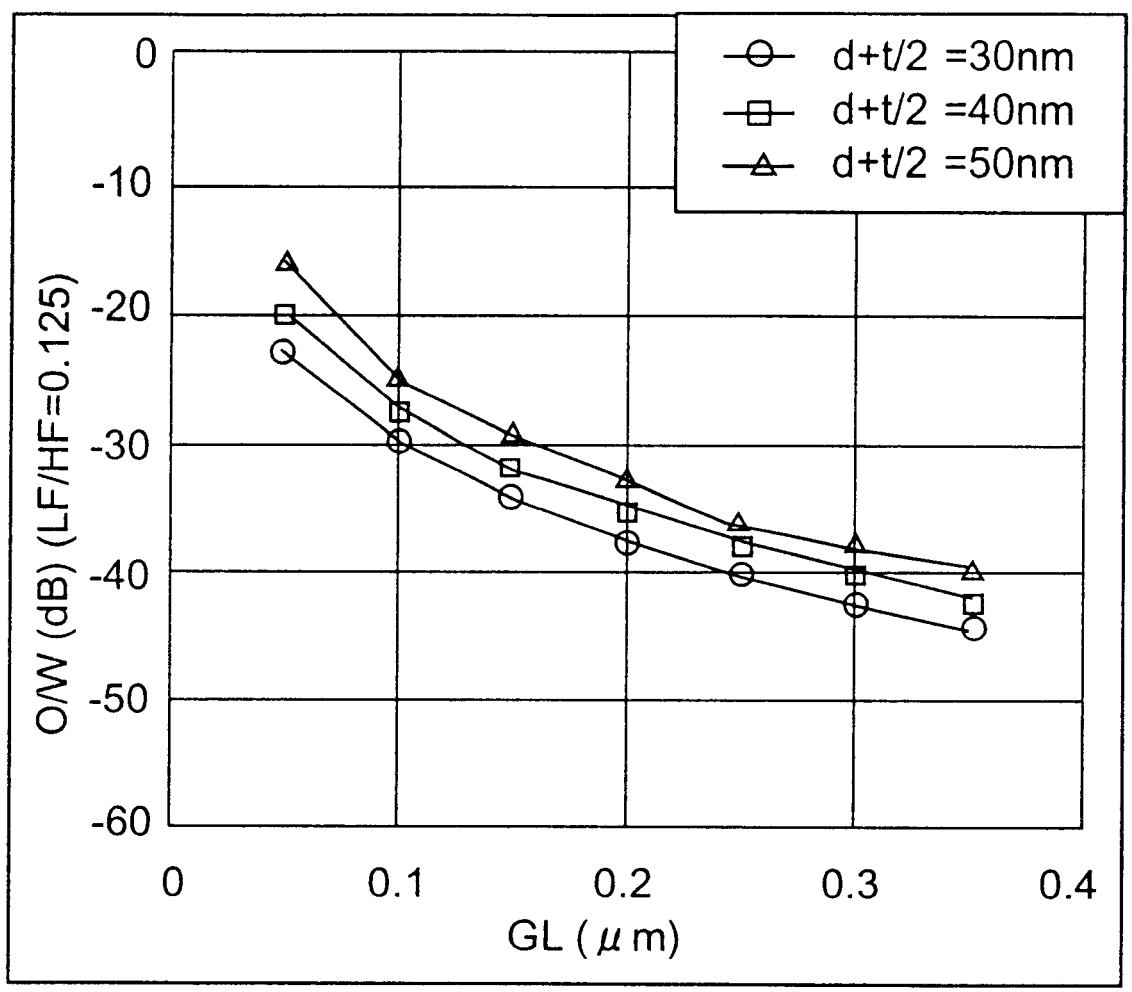
FIG. 14 is a graph showing the gap length dependency of an O/W.

FIG. 14 is a graph showing the gap length dependency of an O/W.

The abscissa of FIG. 14 indicates the gap length GL of a recording head, and the ordinate of FIG. 14 indicates an O/W. The value of the O/W calculated by this simulation is a value obtained when the ratio LF/HF=0.125. In FIG. 14, results obtained when magnetic distances d+t/2 between the floating surface of the recording head and a middle portion in the thickness of the magnetic film of the magnetic disk are set to be 30 nm, 40 nm, and 50 nm are indicated by a plurality of white circles, a plurality of white rectangles, and a plurality of white triangles, respectively.

When the magnetic distance d+t/2 has any value, the O/W is monotonously decreased with an increase in the gap length GL. This result is obtained because the intensity of a diamagnetic field which causes the HTS increases as the length of the region r2 in the direction of the track decreases. For this reason, it is understood that an effective gap length is increased by increasing the gap length GL to perform such an improvement that the O/W is decreased by suppressing the HTS. It is understood that, in order to make the O/W equal to or smaller than −30 dB, the gap lengths GL of 0.1 μm or more, 0.13 μm or more, and 0.16 μm or more are required when the magnetic distances d+t/2 are 30 nm, 40 nm, and 50 nm, respectively.

However, the gap length GL is excessively large, a magnetic field easily leaks out of a track to be recorded, and recording blur in which unnecessary recording is performed to the outside of the track occurs as will be described below.

<Magnetic Field Intensity Distribution>

An intensity distribution recording magnetic fields, which are applied from a recording head having a write core width of 0.3 μm to the magnetic layer of a magnetic disk, in the direction of track width at a gap center was calculated.

Figure 15:
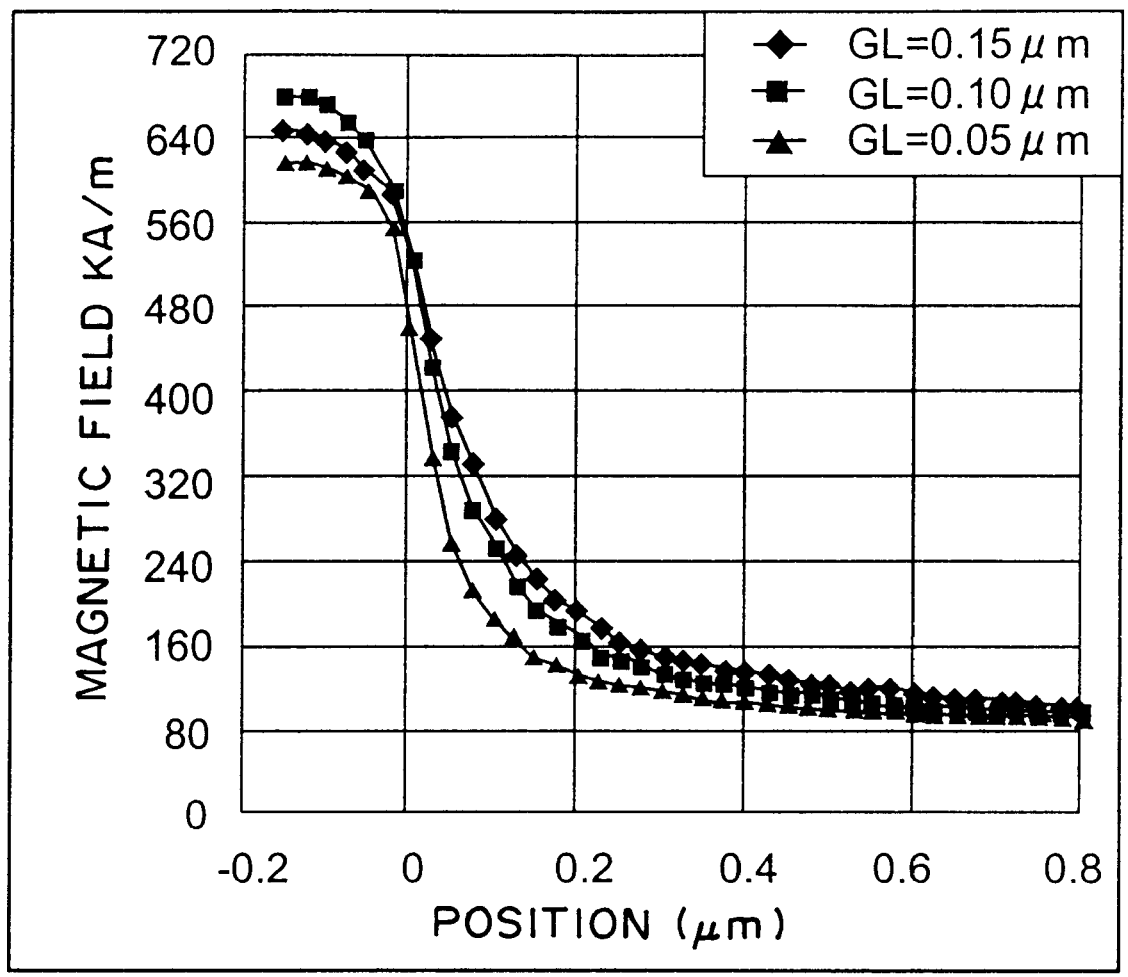
FIG. 15 is a graph showing an intensity distribution of recording magnetic fields in a direction of track width.

FIG. 15 is a graph showing the intensity distribution of recording magnetic fields in the direction of track width.

The abscissa in FIG. 15 indicates positions in the direction of track width. The origin of the positions is defined as the position of one end of the sub-magnetic pole. At the position of −0.15 μm, the central portion of the sub-magnetic pole, i.e., the center of the track in the direction of width. The ordinate in FIG. 15 indicates the intensity of a recording magnetic field. In FIG. 15, results obtained when the gap lengths GL of the recording head are 0.15 μm, 0.10 μm, and 0.05 μm are indicated by a plurality of black lozenges, a plurality of black rectangles, and a plurality of black triangles, respectively.

When the gap length GL had any value, the intensity of the recording magnetic field decreases as the head is separated from the center of the track width by using a position of −0.15 μm as a peak. The spread of recording blur is regulated by the spread of a region, in which the intensity of the recording magnetic field exceeds the coercive force $H_c$ of the magnetic disk, in the direction of track width. Here, as described above, since the coercive force $H_c$ of the magnetic disk is 288 kA/m, when the gap lengths GL are 0.05 μm, 0.10 μm, and 0.15 μm, the spreads of recording blur to the outside of a track to be recorded are 0.4 μm, 0.8 μm, and 1.2 μm, respectively. In this manner, the spread of recording blur increases as the gap length GL increases.

<Guard Bandwidth and Gap Length Dependency of O/W>

In consideration of the results of the gap length dependency and the magnetic field intensity distribution in the direction of track width shown in FIGS. 14 and 15, the numeral calculation results of both the gap length, GL dependency of a guard bandwidth (width of unrecorded region between adjacent tracks) and the gap length GL dependency of the O/W will be described below.

Figure 16:
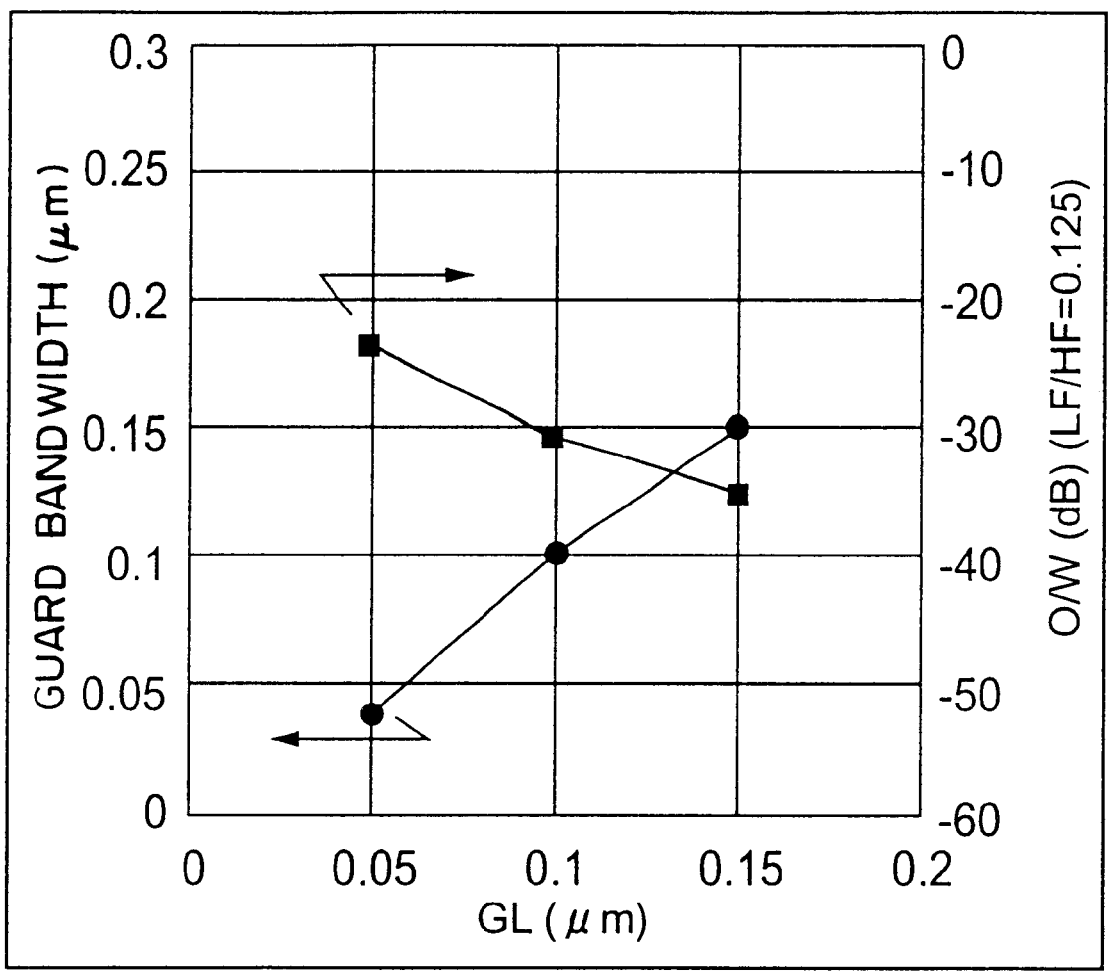
FIG. 16 is a first graph showing the gap length dependency of a guard bandwidth and an O/W.
Figure 17:
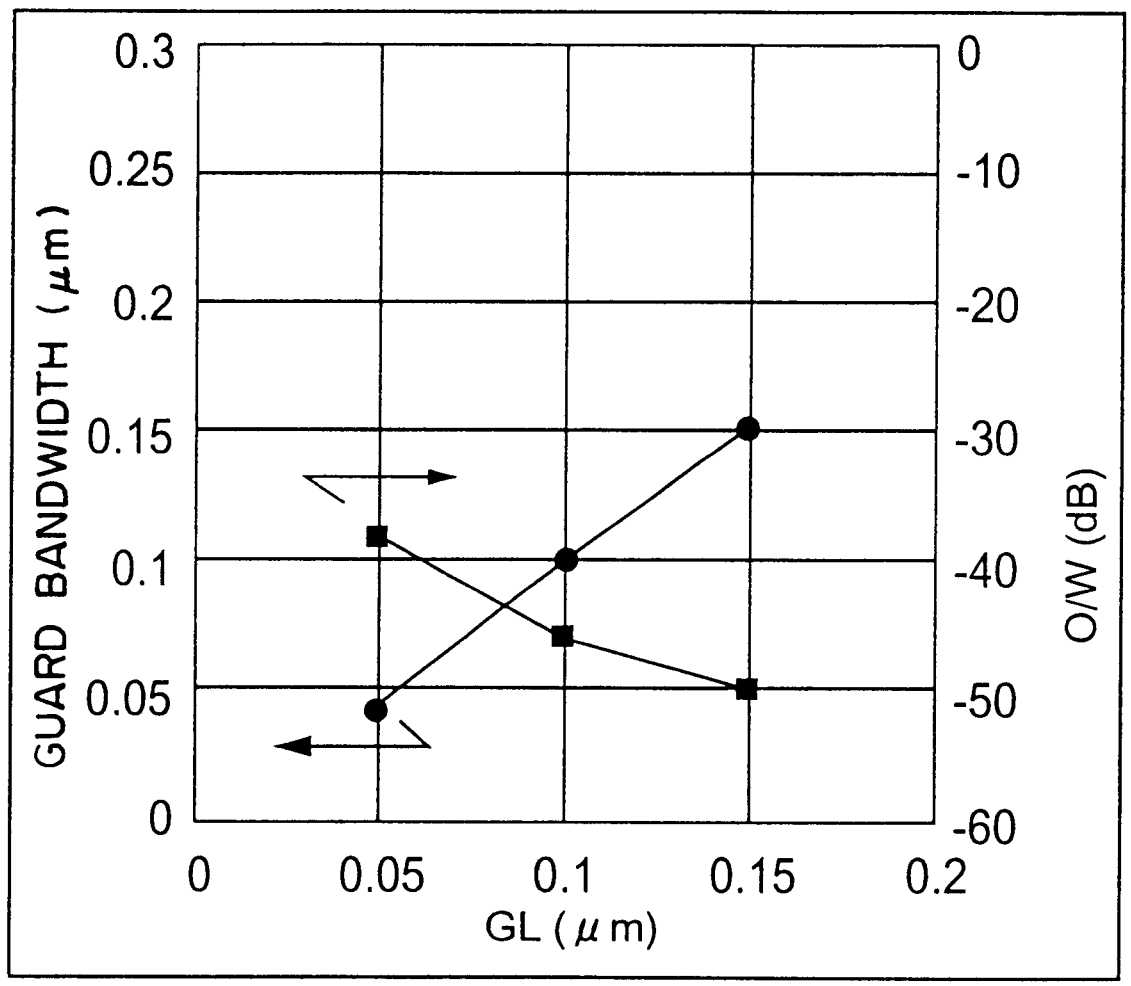
FIG. 17 is a second graph showing the gap length dependency of a guard bandwidth and an O/W.

FIG. 16 is a first graph showing the gap length dependency of a guard bandwidth and an O/W, and FIG. 17 is a second graph showing the gap length dependency of a guard bandwidth and an O/W.

In each of FIGS. 16 and 17, the abscissa indicates a gap length GL, and the ordinate indicates a guard bandwidth and an O/W. A plurality of black circles in FIGS. 16 and 17 indicate guard bandwidths which are evaluated to be required to avoid recording blur on the basis of the size of the spread of the recording blur described with reference to FIG. 15. The guard bandwidth is determined such that an average magnetic field applied to a track adjacent to a track to be recorded is half the coercive force $H_c$ of the magnetic disk. As shown in FIGS. 16 and 17, the necessary guard bandwidth increased to 0.04 μm, 0.1 μm, and 0.15 μm as the gap length GL increased to 0.05 μm, 1 μm, and 0.15 μm. Since a track density decreases when the guard bandwidth increases, the guard bandwidth is preferably suppressed to a small value from the point of view of a high recording density.

The plurality of black rectangles in these drawings indicate calculation results of an O/W. The calculation result of the O/W shown in FIG. 16 is an O/W obtained when a recording pattern is recorded by a conventional method when the ratio LF/HF=0.125. As the gap length GL increased 0.05 μm, 1 μm, and 0.15 μm, the O/W sequentially decreased to −24 dB, −31 dB, and −35 dB. In contrast to this, the calculation result of the O/W shown in FIG. 17 is an O/W obtained when a recording pattern is recorded by performing pre-recording correction after a DC erasing operation. In FIG. 17, as in FIG. 16, as the gap length GL increased 0.05 μm, 0.1 μm, and 0.15 μm, the O/W sequentially decreased to −38 dB, −46 dB, and −50 dB. On the basis of the values of the O/W, it is understood that the O/W is reduced by about 15 dB by the DC erasing operation and the pre-recording correction.

From these calculation results, the range of the gap length GL which satisfies a high recording density and a preferable O/W is calculated. Here, the reference of the recording density is set to be a track density of 60 ktpi (kilo track per inch) or more, and the reference of the O/W is set to be −30 dB or less. In order to realize the track density having 60 ktpi at a core width of 0.3 μm, a guard bandwidth of 0.12 μm or less is required. In order to realize the guard bandwidth of 0.12 μm or less, as shown in FIGS. 16 and 17, the gap length GL must be 0.12 μm or less.

In recording performed without a DC erasing operation, as shown in FIG. 16, in order to realize an O/W of −30 dB or less, the gap length GL must be 0.10 μm or more. For this reason, in order to satisfy the reference of the track density and the reference of the O/W, the design value of the gap length GL must satisfy a condition $0.10 \, \mu m \leq GL \leq 0.12 \, \mu m$. This condition is very severe in consideration of a manufacturing tolerance or the like. In addition, when the reference of the track density is made severe, and when a guard bandwidth of 0.1 μm or less is required, no solution exists. As described above, in the recording performed without the DC erasing operation, it is understood that a low O/W and a high track density are not easily satisfied in the future.

In contrast to this, when recording with pre-recording correction is performed after a DC erasing operation, as shown in FIG. 17, although the gap length GL is 0.05 μm, the O/W is sufficiently smaller than the O/W of −30 dB which is the reference. For this reason, in order to satisfy the reference of the track density and the reference of the O/W, it is sufficient that the design value of the gap length GL satisfies a condition $0.05 \, \mu m \leq GL \leq 0.12 \, \mu m$. In this manner, in a HDD in which recording with pre-recording correction is performed after a DC erasing operation is performed, a sufficient O/W is obtained even though the gap length GL is 0.1 μm or less, and a high track density can be achieved.

<Repeated DC Erasing Operation>

Figure 18:
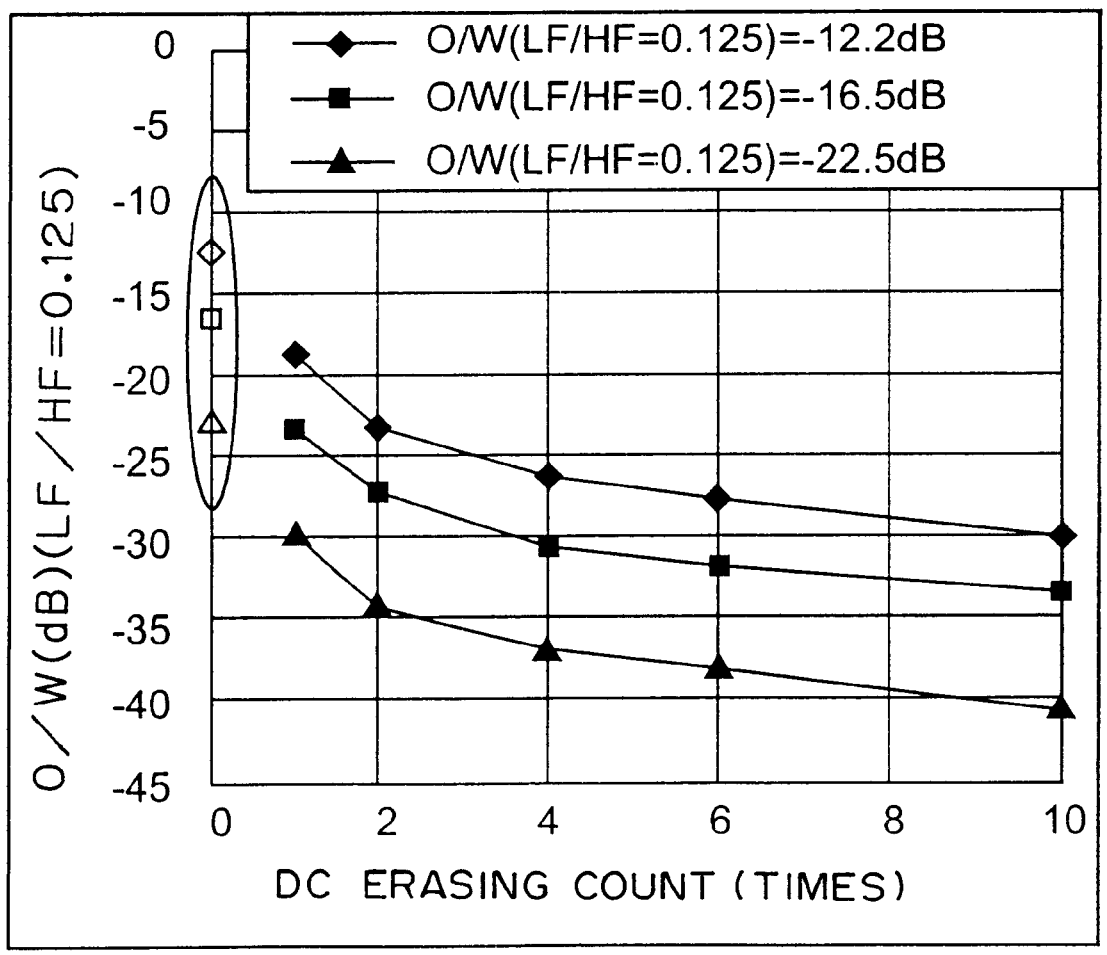
FIG. 18 is a graph showing the repeated DC erasing count dependency of an O/W.

FIG. 18 is a graph showing the repeated DC erasing count dependency of an O/W.

The abscissa in FIG. 18 indicates a DC erasing count, and the ordinate indicates an O/W. A white lozenge, a white rectangle, and a white triangle exist on the ordinate indicating that the DC erasing count is 0 are observed values of the O/W in recording without a DC erasing operation when the ratio LF/HF is 0.125. These three HDDs exhibit an O/W of −12.2 dB, an O/W of −16.5 dB, and an O/W of −22.5 dB as indicated by the white lozenge, the white rectangle, and the white triangle, respectively. A black lozenge, a black rectangle, and a black triangle indicate observed results of the O/W in recording with a DC erasing operation and pre-recording correction of the HDDs exhibit the O/Ws indicated by the white lozenge, the white rectangle, and the white triangle.

In any HDD, as described with reference to FIG. 10, as a DC erasing count increased, the O/W monotonously decreased. More specifically, in any HDD, in comparison with a case in which a DC erasing operation was not performed, the O/W decreased by 6 dB or more by performing a DC erasing operation once, the O/W decreased by 10 dB or more by performing the DC erasing operation twice, and the O/W decreased by 17 dB or more by performing the DC erasing operation ten times.

As is apparent from the result, a recording head in which an O/W obtained without a DC erasing operation is larger than −30 dB can achieve −30 dB and can be used by performing a repeated DC erasing operation. In this manner, a recording head has such recording capability that a desired S/N ratio can be obtained, even though the recording head is inferior such that an O/W obtained when a DC erasing operation is not performed is, e.g., −12 dB, can be used as a preferable recording head which exhibits a low O/W, i.e., a low error rate, by using a repeated DC erasing operation and pre-recording correction.

As has been described above, according to the present invention, an information recording device which records information at a high recording density such that an error rate is reduced.

What is claimed is:

1. An information recording device in which magnetic fields are applied to small regions of a disk-like recording medium having magnetizations in small regions on a surface to invert the directions of magnetization of the small regions so as to record information on the recording medium, comprising:

a magnetic head, arranged near or to be close to the recording medium, for applying magnetic fields to the small regions when the magnetic head relatively moves with respect to the recording medium to pass on the small regions of the recording medium; and a magnetic head controller for controlling the magnetic head to cause the magnetic head to apply magnetic fields to the small regions in a free region of the recording medium in a standby state in which at least information is not recorded on the recording medium to make the directions of magnetization of the small regions uniform so as to erase the information in the predetermined free region.

2. An information recording device according to claim 1, wherein the magnetic head controller controls the magnetic head to cause the magnetic head to apply magnetic fields to the small regions of the free region in which the information is erased at timings depending on the directions of the magnetic fields to record information.

3. An information recording device according to claim 1, wherein the magnetic head controller controls the magnetic head to cause the magnetic head to apply magnetic fields to the small regions at least twice to erase information in the small regions.

4. An information recording device according to claim 1, wherein the magnetic head controller controls the magnetic head to apply a magnetic field which is stronger when information is erased than when information is recorded.

5. An information recording device according to claim 1, wherein the magnetic head has a recording head for recording information, and the recording head also has a function of erasing information.

6. An information recording device in which magnetic fields are applied to small regions of a rotatable disk-like recording medium having magnetizations in small regions on a surface to invert the directions of magnetization of the small regions so as to record information on the recording medium, comprising:

a recording head, fixed to a distal end of an arm having a predetermined rotating center and a distal end moving on the recording medium in a diameter direction of the recording medium, for recording information by applying magnetic fields to the small regions when the magnetic head relatively moves with respect to the recording medium while being near or in contact with the recording medium to pass on the small regions of the recording medium, and a recording head controller for controlling the recording head to cause the magnetic head to apply magnetic fields to the small regions in a predetermined region of the recording medium to make the directions of magnetization of the small regions so as to erase the information in the predetermined region uniform, and for causing the recording head to apply magnetic fields to the small regions of the predetermined region in which the information is erased at timings depending on the directions of the magnetic fields to record information.

* * * * *